United States Patent

Goertz et al.

[11] Patent Number: 5,219,465
[45] Date of Patent: Jun. 15, 1993

[54] SULFUR COATED FERTILIZERS AND PROCESS FOR THE PREPARATION THEREOF

[75] Inventors: Harvey M. Goertz; Richard J. Timmons; George R. McVey, all of Marysville, Ohio

[73] Assignee: The O.M. Scott & Sons Company, Marysville, Ohio

[21] Appl. No.: 666,339

[22] Filed: Mar. 8, 1991

[51] Int. Cl.$^5$ .......................... C05C 9/00; C05G 3/10; C05G 5/00
[52] U.S. Cl. ........................ 71/28; 71/64.07; 71/64.11; 71/64.13; 71/904
[58] Field of Search .................. 71/904, 64.11, 28–30, 71/64.07, 64.12, 64.13, 27

[56] References Cited

U.S. PATENT DOCUMENTS

| | | | |
|---|---|---|---|
| 3,576,613 | 4/1971 | Fleming | 71/64.11 |
| 3,903,333 | 9/1975 | Shirley, Jr. et al. | 71/64.11 |
| 4,881,963 | 11/1989 | Fujita et al. | 71/804 X |

Primary Examiner—Ferris Lander
Attorney, Agent, or Firm—Jones, Day, Reavis & Pogue

[57] ABSTRACT

Extended residual, controlled release sulfur coated fertilizer products having polymeric topcoats applied thereover are provided which release the fertilizer at a diffusion controlled rate essentially linearly over time. Processes are also provided for preparation of such products.

43 Claims, 8 Drawing Sheets

*PERCENT OF TOTAL YIELD OF TURF TREATED WITH UREA

*PERCENT OF TOTAL YIELD OF TURF TREATED WITH UREA

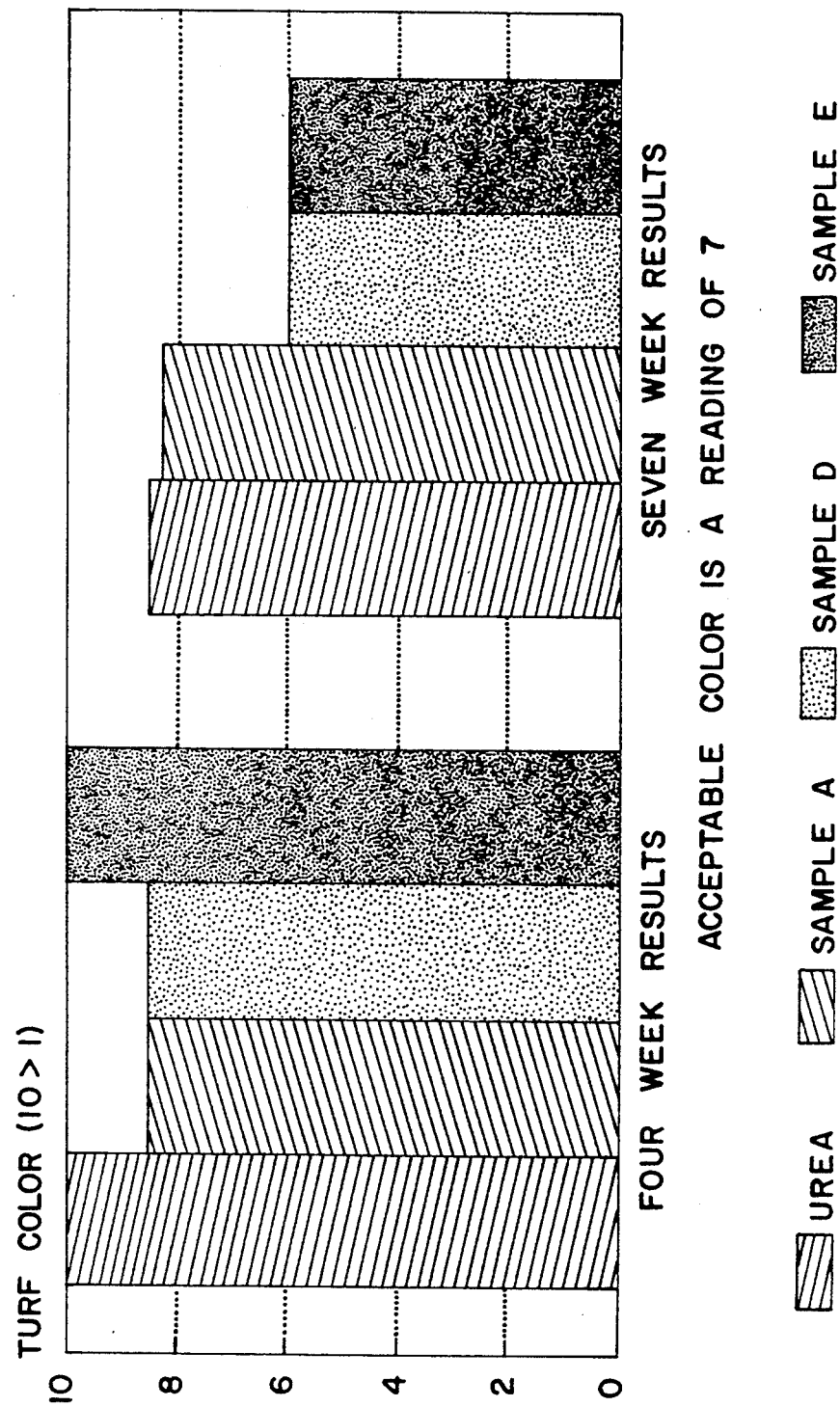

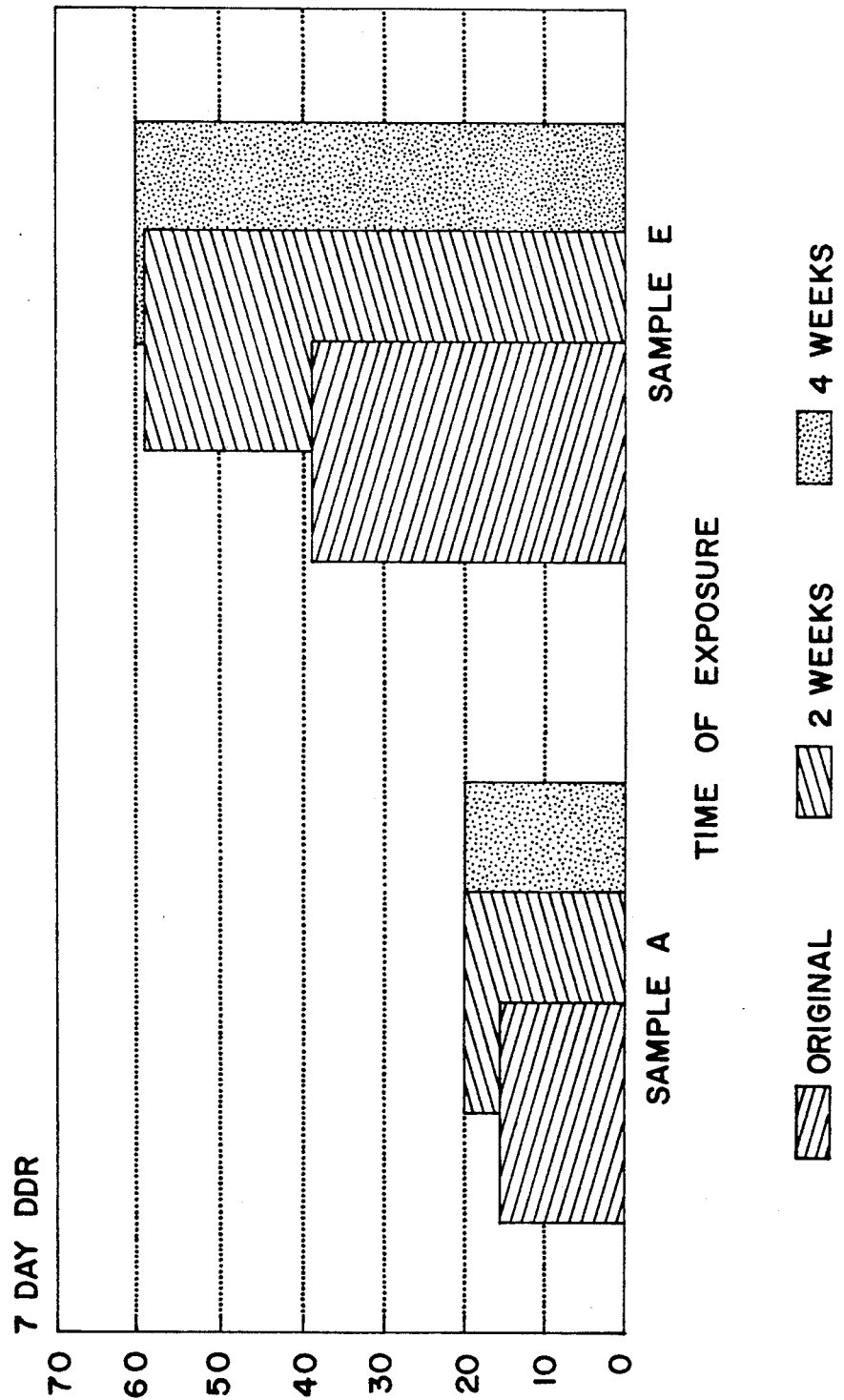

SULFUR COATED FERTILIZERS AND PROCESS FOR THE PREPARATION THEREOF

BACKGROUND OF THE INVENTION

1. Field of the Invention

This invention relates to extended residual, controlled release fertilizers exhibiting diffusion release kinetics and to processes for the preparation thereof.

2. Description of Related Art

Controlled release fertilizer technologies (also known as "slow release" fertilizers) can be categorized into various groups with one of such groups being coated fertilizers. Of the coated fertilizers, sulfur coated urea (SCU) has received the most extensive use and commercial development in view of its favorable economics. Another group of coated fertilizers relates to polymer or resin coated fertilizers which have shown superior longevity to sulfur coated products but have been restricted in use and commercial application as a result of their high relative cost of production predominantly due to the cost of the polymeric material, the use of recovery systems in their production and other processing considerations.

Accordingly, it has been a continuing problem to provide economically advantageous sulfur coated fertilizer products having enhanced release characteristics including extended residual properties such that the sulfur coated products provide release results approximating resin coated fertilizers at lower cost.

Sulfur coated ureas were first developed in 1968 by the Tennessee Valley Authority (TVA) in Muscle Shoals, Ala., as an economical system for reducing the rate of dissolution of urea particles when they are applied to the soil as a fertilizer. As a result of its early work, TVA determined the necessity for applying a sealant material in order to fill in the imperfections which occur in the sulfur coating as the sulfur cools. U.S. Pat. Nos. 3,295,950 and 3,342,577 describe the TVA sulfur coating process and also the sealant material. In addition, TVA's Bulletin Y-79 (1974) describes the development of a number of sealants over the years including TVA's original SAE 30 oil and Shellmax 800 microcrystalline wax. The current TVA recommended sealant which is now used by the majority of manufacturers of sulfur coated urea is described in TVA Bulletin Y-181 (1983). This sealant is a mixture of 30% (by weight) low molecular weight polyethylene resin in 70% (by weight) brightstock mineral oil.

The development of TVA's sulfur coated urea technology is further detailed in Bulletin Y-79, National Fertilizer Development Center, Tennessee Valley Authority, Muscle Shoals, Ala., August, 1974. In that bulletin, process conditions were described for urea preheating, sulfur coating, mixing of wax and microbicide and application to SCU in a second drum, cooling of the topcoated product and addition of a conditioner in a third drum.

The TVA process is further described in TVA Bulletin Y-136 (1978). Furthermore, the requirement for a sealant for sulfur coated urea (SCU) has been documented in the literature.

The mechanism of nutrient release from sulfur coated urea has been the subject of considerable study. However, it is now generally accepted that sulfur coated ureas release through pores and fissures in the sulfur coating. In this regard, Jarrell, W. (1977) *Nitrogen Release from Granules of Sulfur-Coated Urea*, Oregon State University, Ph.D., 1977, p. 57, reported that microorganisms colonize the surface of the sulfur coated products and degrade the coating at a rate dependent on the growth rate of the colony and the activity of the organisms. No urea is released to the environment until pin holes and cracks in the sulfur are exposed by the degradation of the wax coating.

As applied in the field, the nutrient release of such fertilizers has been found to be non-uniform and temperature sensitive due to variation in microbial activity. TVA's U.S. Pat. No. 3,342,577 to G. M. Blouin and D. W. Rindt indicates that microbicides are sometimes incorporated into the coating to prolong microbial degradation of the coating and to thereby extend the effective life of the fertilizer. Specifically, U.S. Pat. No. 3,342,577 demonstrated the necessity of including a microbicide in a soft wax coating to prevent its rapid microbial degradation in soil.

In U.S. Pat. No. 3,295,950 to G. M. Blouin and D. W. Rindt, which is assigned to TVA, synergism in controlled release properties is demonstrated for a two layer coating of sulfur and soft wax. The soft wax layer consists typically of petrolatum or petroleum soft waxes or oils. This synergism is demonstrated by showing that, as measured by dissolution in water, the wax coating alone provided no controlled release properties but dramatically improved the controlled release properties of SCU.

The prior art has also disclosed the optional addition to sulfur of materials such as polysulfide plasticizers, micronutrients or fillers such as vermiculite. The prior art (U.S. Pat. No. 3,295,950) has further described the benefits from a soft wax precoat. Furthermore, the prior art has disclosed that the use of a soft wax top coating has required addition of a conditioner such as diatomaceous earth or clay to the surface of the particle to render the product free flowing and for product handling and storage as described by Rindt, Blouin and Getsinger (J. Agric. & Food Chem., 16, 773, September/October, 1968). Typical products of this type have included about 2-3% sealant and about 2-2.5% conditioner.

The seven day dissolution rate is a test of the amount of urea nitrogen which dissolves when a 50 gram sample of the product is immersed in 250 ml of water at 37.8° C. (100° F.) for seven days. From such testing, it has been determined that the seven day dissolution rate of the prior art TVA-type coated SCU products including about 2-3% sealant and about 2-2.5% conditioner was in the range of 15-35%. In accordance with guidelines published by the Association of American Plant Food Control Officials (AAPFCO), for a coated fertilizer to be classified as a controlled release ("slow release") product, it must contain a minimum of 15% coated slow release nitrogen as measured by AOAC Official Method of Analysis (1990) number 970.04. Typically, samples that demonstrate less than 50% seven day dissolution rate in static water will demonstrate considerable slow release nitrogen by the test method 970.04. Thus, the prior art coatings have been considered to be "controlled release" by the AAPFCO guidelines. However, it is commonly known that water dissolution rate alone does not relate well to the performance of coated fertilizers under field conditions (see TVA Publication Y-181 and Journal AOAC Vol. 68, No. 4).

In this regard, it should be noted that testing has indicated that an SCU product having a top coating of SAE 30 oil should be classified in accordance with its leach test data to have excellent controlled release properties. However, when this product was imbedded in soil, capillary action removed the oil and caused rapid dissolution of the fertilizer. Similarly, certain waxes provide a top coat that greatly enhances controlled release properties as demonstrated by the water dissolution tests. However, in the soil, these top coats are quickly degraded by microbes and much of the added controlled release is lost (see "Sulfur Coating on Nitrogen Fertilizer to Reduce Dissolution Rate," D. W. Rindt; G. M. Blouin; and J. G. Getsinger; Agricultural and Food Chemistry, Vol. 16, No. 5, p. 773, September, 1968).

As a further example, a sulfur only SCU product can be given dramatically improved slow release nitrogen ratings as assessed by AOAC Method 970.04 and seven day dissolution values merely by increasing the coating weight of sulfur (e.g., from 17% to 25% sulfur). Field agronomic studies have shown, however, that the 25% coating does not provide additional slow release benefits. Such coating simply decreases the efficiency of the SCU by contributing to "lock off", the portion of the nitrogen which does not release within a growing season. Therefore, it can be seen that although fertilizers may be classifiable as "slow release" through the AAPFCO definition, the only manner of accurately assessing the true agronomic value of such fertilizer is through agronomic testing.

In summary, the prior art has disclosed multilayer coatings in which sulfur is the first layer and a secondary coating such as a soft wax and/or an oil/polyethylene (e.g., a brightstock oil/polyethylene) is applied to seal the flaws and imperfections in the sulfur coating. Such coatings provide a potent barrier to moisture and essentially prevent the immediate release normally encountered with sulfur-only coatings. The presence of these coatings also enables some reduction in the thickness of the sulfur coat required thereby reducing the undesireable "lock off" effects (i.e., the fertilizer becomes agronomically ineffective as a result of the inability of the product to release nutrient values during a given fertilization period). However, the prior sulfur coated products still suffer from a significant defect in regard to their ability to provide acceptable release characteristics over extended periods of time.

Specifically, prior sulfur coated fertilizers including topcoated sulfur coated urea products have almost exclusively exhibited release mechanisms which fit the model of a "matrix kinetic" pattern of release of encapsulated materials as characterized and discussed in the literature (See Patrick B. Deasy, "Microencapsulation and Related Drug Processes," Marcel Dekker, Inc., New York, 1984, at pages 311-316). For example, as previously noted, prior topcoated SCU products have released their nutrient values based on the microbial degradation of the sealant coating in order to allow the encapsulated fertilizer to release from the core through the defects in sulfur coating. Such a release pattern is in accordance with matrix kinetics wherein the release of the encapsulant proceeds at a rate linear to the square root of time. Thus, these products have demonstrated release patterns providing a rapid initial release of active ingredients followed by a rate of release which diminishes over time. Release patterns of this type have been recognized to significantly limit the usefulness of such products as extended residual, controlled release fertilizers.

In U.S. Pat. No. 3,576,613, an agronomically improved sulfur coated fertilizer was disclosed which included a finely divided powdered subcoat applied directly to the fertilizer core beneath a sulfur coating. A hydrophobic sealant topcoat was also disclosed for application over the powder-subcoated, sulfur-encapsulated fertilizers. However, although such products have demonstrated certain improvements in release characteristics, they exhibit the disadvantage of requiring an additional coating step in the process which adds significantly to the complexity of the production process and the cost of the resulting products.

Exemplary of particularly preferred topcoated sulfur coated fertilizer products are those polymer coated products described in commonly assigned, co-pending U.S. patent application Ser. No. 07/655,157, filed Feb. 14, 1991, entitled "Abrasion Resistant Coatings for Fertilizers," the disclosure of which is incorporated herein by reference. However, agronomic testing of the products disclosed in that application demonstrates that such products function on the basis of matrix kinetic patterns of release and, accordingly, suffer from the same disadvantages as discussed above in regard to their inability to provide extended residuals over long periods of time.

In contrast to the matrix kinetic release patterns of sulfur coated products, including polymer topcoated sulfur coated ureas, polymer coated fertilizers such as those described in commonly assigned, U.S. Pat. No. 5,089,041, entitled "Encapsulated Slow Release Fertilizers," the disclosure of which is also incorporated herein by reference and those sold by Sierra Chemical Co. under the trade name "Osmocote" have been known which release their nutrient core primarily via a diffusion mechanism. In such products, the release of nutrients from coated prills is initiated by movement of water vapor through the coating which dissolves the soluble core; the nutrients in solution then diffuse outwardly through the coating membrane and into the soil (Janick, J., "Horticultural Reviews," Vol. 1, p. 89).

Products which demonstrate diffusion kinetic release mechanisms are known as reservoir devices and such products provide a uniform release which does not taper off with time. That is, such products demonstrate release of nutrients such as fertilizers from a coated or encapsulated core at a diffusion controlled rate of essentially zero-order such that the core material releases from the coating essentially linearly over time. Thus, these products provide longer residual nutrient application characteristics over a longer period of time with increased efficiency of feeding of turf and other crops.

The primary disadvantage of such prior polymer or resin coated products providing diffusion controlled release is one of cost of production resulting from the amount of relatively expensive polymeric coating material required in order to achieve the desired release capabilities. Also, the processing equipment including the recovery systems as well as the very precise application equipment and techniques required to produce such products have added significantly to their cost of production.

SUMMARY OF THE INVENTION

Accordingly, it is a primary object of the present invention to provide sulfur coated fertilizer products which have significantly improved extended residual, controlled release properties over a longer period than previously known sulfur coated products.

It is a more specific object to provide sulfur coated fertilizer products which exhibit diffusion controlled release mechanisms comparable with prior polymer coated products at a significantly lower cost. A companion object is to provide sulfur coated fertilizer products which release fertilizer core materials at a diffusion controlled rate of essentially zero-order such that the fertilizer core releases from the coating essentially linearly over time.

Another important object of this invention is to provide a process for applying a polymeric topcoat over a primary sulfur coating on a particulate fertilizer core in a manner such that the resulting product demonstrates release of the fertilizer core via a diffusion mechanism rather than by matrix kinetic release.

Yet another significant object is to provide a process for preparing an extended residual, controlled release sulfur coated fertilizer product having a polymeric topcoat applied thereto which releases fertilizer at a diffusion controlled rate of essentially zero-order such that the fertilizer core releases essentially linearly over time.

A further significant object is to provide high efficiency slow release sulfur coated urea products which do not "lock off" and which demonstrate different and enhanced release kinetics as compared with prior sulfur coated urea products and which provide release characteristics equivalent to the polymer or resin coated fertilizers.

The foregoing and other objects of the invention are achieved by providing extended residual, controlled release sulfur coated fertilizer products which release the fertilizer from the coating at a diffusion controlled rate essentially linearly over time and processes for the preparation thereof. In particular, we have found that the nutrient release pattern of sulfur coated urea products can be significantly altered by applying appropriate polymer topcoats over a fresh primary sulfur coating. More particularly, soluble particulate fertilizer cores including granules and prills when coated with a primary sulfur coating by methods developed by TVA or otherwise and subsequently coated while still fresh with a polymeric topcoat having particular characteristics have been found to achieve unique nutrient release patterns and agronomic results compared to those exhibited by prior sulfur coated fertilizers even coated with polymeric topcoats.

Nutrient release in the products of the present invention is achieved by diffusion kinetics similar to the release pattern shown by expensive polymer coated fertilizers which require high coating levels and very precise application equipment and techniques of production. In accordance with the present invention, products demonstrating diffusion release kinetics have been provided which are prepared at relatively low cost with substantially reduced polymer coating levels and with comparatively simpler process equipment utilizing simpler production techniques.

Accordingly, a product of the present invention comprises a particulate water-soluble fertilizer core having a primary sulfur coating thereon with a polymeric topcoat applied thereover. The primary sulfur coating is fresh at the time the polymeric topcoat is applied thereover and the fresh sulfur coating provides a surface on the fertilizer core which has essentially no stress induced surface discontinuities therein. Also, the fresh sulfur coating includes a sufficient amorphous sulfur content at the time the polymeric topcoat is applied thereover to preserve the surface integrity of the coating.

The polymeric topcoat is formed from a water insoluble polymeric film-forming composition having membrane-like permeability characteristics which enables the fertilizer core to be released at a diffusion controlled rate of essentially zero-order such that said fertilizer releases essentially linearly over time.

The products of the present invention are prepared by coating the particulate water-soluble fertilizer core with a primary sulfur coating and applying a polymeric topcoat over the primary sulfur coating while the sulfur coating on the fertilizer core is still fresh. The fresh sulfur coating preferably has not been cooled to a temperature below about 120° F. prior to the application of the polymeric topcoat thereover but it has been cooled sufficiently to provide a surface on the fertilizer core which has essentially no stress induced discontinuities therein. The fresh sulfur coating contains sufficient amorphous sulfur content at the time the polymeric topcoat is applied thereover to preserve the surface integrity of the coating. The polymeric topcoat is formed from a water insoluble polymeric film-forming composition having membrane-like permeability characteristics for release of the fertilizer core at a diffusion controlled rate of essentially zero-order such that the fertilizer core releases essentially linearly over time. Also, in the event that the polymer topcoat is applied as a molten composition, the topcoat must be applied under low shear conditions in order to achieve desired coating results.

BRIEF DESCRIPTION OF THE DRAWINGS

FIG. 7 is a chart showing the relative cool weather response of polymer topcoated SCU fertilizer products of the present invention in comparison with prior art SCU and urea fertilizers; and FIG. 8 is a chart showing the effect of environmental exposure on the nitrogen release capabilities of a polymer topcoated SCU fertilizer product of the present invention as compared with a prior art SCU fertilizer product.

DETAILED DESCRIPTION

Figure 1:
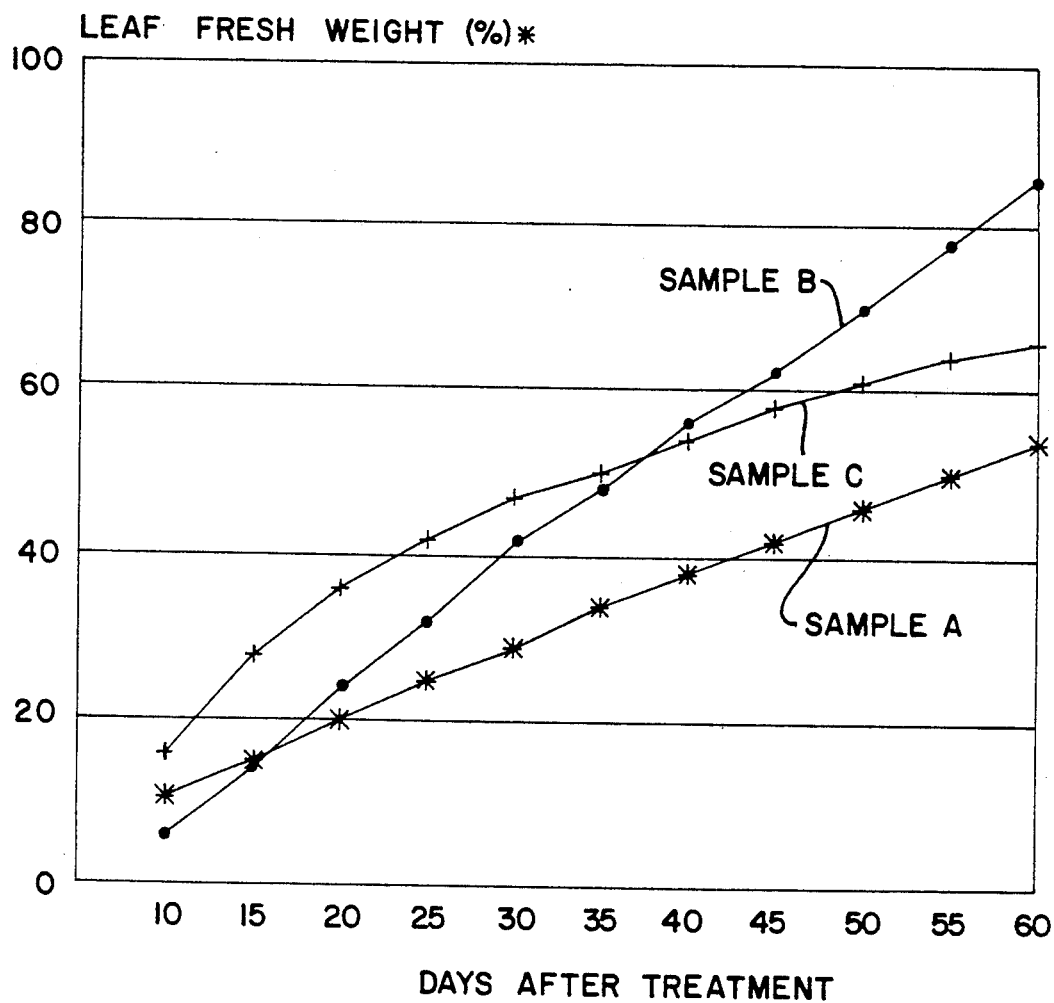
FIG. 1 is a graph of the greenhouse turf response achieved with a polymer topcoated SCU fertilizer products of the present invention compared with prior art SCU fertilizer products.

While the products of the present invention are useful for the controlled release of a variety of active constituents, they are primarily useful for the controlled release of fertilizers and accordingly, will be specifically described in connection with a water soluble fertilizer substrate. However, it is to be recognized that the invention is also applicable to the coating of other water soluble active constituents where prolonged or controlled release is desirable, including pesticides, herbicides, fungicides, growth regulators, insecticides and animal and insect repellents. Such active constituents are well known and examples are set forth in the literature. It is preferable that the active constituent be in solid, granular or particulate form and it should not decompose or melt at processing temperatures. In addition, the active constituent will normally be moderately to highly water soluble. Thus, a principle object in the use of the coated or encapsulated products of the present invention is to control the leaching of the active constituent therefrom with water.

In general, the process of the present invention includes the coating of a fertilizer core with a primary sulfur coating followed by the application of a polymeric topcoat thereover while the primary sulfur coating is still fresh.

As used herein the term "fresh" in reference to the primary sulfur coatings applied to the particulate cores of the sulfur coated products of this invention refers to coatings whose temperatures have not dropped below 120° F. prior to the application of a polymeric topcoat thereover and which, preferably, are less than about 12 hours old and, most preferably, less than about 2 hours old at such time.

Sulfur coatings of this description have not yet developed the physical stresses from phase change that generate the defects, surface irregularities and brittleness that is characteristic of aged sulfur coated products. It is the lack of these surface irregularities as well as lack of dustiness from a brittle sulfur coat that provides a suitable sulfur coated fertilizer substrate for polymer topcoating that will give actual membrane performance from the combined coatings over the fertilizer core.

Fresh sulfur coated fertilizers can be further defined as having a sulfur coating in which the amorphous content has not dropped below the amount necessary to relieve stresses associated with phase changes among sulfur allotropes. Preferably, such content of amorphous sulfur as measured by differential scanning calorimetry (DSC) is greater than about one-half of the amorphous sulfur content (on a weight percentage basis) in the sulfur coating at the time of its application on the fertilizer core. Most preferably, the amorphous sulfur content is above about 10-15% as measured by DSC. The amorphous sulfur acts as an "elastomer" in the "mosaic surface structure" of sulfur coated products (McClellan and Scheib, Advances in Chemistry Series, No. 140, American Chemical Society, 1975, pp. 18–32). Amorphous sulfur in sufficient quantity is necessary herein to minimize the stress of phase changes on the sulfur coating which would impact the quality of the sulfur as a substrate for the polymer topcoat.

In regard to the polymeric topcoat applied over the primary sulfur coating, it may be applied as a liquid (emulsion, solution or melt) or may be reacted in situ depending on the type polymer employed. However, it is preferred to employ a polymer which may be applied in a molten state. In the event that the polymeric topcoat is applied in molten condition, it must be applied under low shear conditions in order to provide the desired end product.

In this regard, it has been determined that, when viscous molten polymeric materials are subjected to high shear, air can be entrained into the melt. This entrained air is detrimental to any coating as it has a tendency to produce pin-holes in the coating as the viscous polymer solidifies.

One way to characterize the shear conditions is by the fluid velocity. These velocities refer to the velocities encountered by the molten polymer at all parts of the process system. This can include velocities in pipes and through nozzles, as well as those imparted by pump impellers and tank agitators.

It has been determined experimentally that air is entrained in a viscous molten polymer as it is sprayed through a series of nozzles (Spraying Systems VeeJet 500025). The calculated exit velocity of the polymer from these nozzles is 140 feet per second (fps) and 108 fps for flow rates of 0.35 lb/min and 0.27 lb/min, respectively.

It has been further determined that no air is entrained in the viscous molten polymer when it is dribbled onto the sulfur coated urea. The calculated dribble velocities are 1–2 fps.

Thus, low shear conditions may be defined as those in which the fluid velocity of the molten polymer does not exceed 10 fps, preferably not in excess of 5 fps. In various application techniques in accordance with the processes of the present invention, the following fluid velocities are preferred for the low shear application of molten polymers over the sulfur surface:

| | |
|---|---|
| Dribble Velocity | 1.1 fps |
| Pipe Velocity | 0.5 fps |
| Pump Impeller | 3.1 fps |
| Tank Agitator | 0.4 fps |

Polymers suitable for use in the polymeric topcoats of the present invention are selected from polymers having sufficient structural integrity to withstand environmental conditions for a period of at least six weeks and have membrane-like permeability characteristics for release of the fertilizer core through the polymer film at a diffusion controlled rate.

More specifically, to qualify as a suitable polymer topcoat on sulfur which causes the fertilizer to release as a reservoir-membrane device, the polymer must possess certain physical properties. First, the polymer coating must have environmental stability during the period of fertilization and must withstand temperature extremes. It, therefore, must have a melting point above about 120° F. and preferably above 140° F. Additionally, the polymer must be insoluble in water. To function as an integral part of a coating with membrane properties, the polymer must also have good vapor barrier characteristics and, in particular, low permeability to water vapor.

Permeability to water vapor is calculated in accordance with the following formula:

$$P = \frac{(V)(T)}{(A)(t)(p)}$$

Wherein the units describe the volume (V) of gas (water vapor) expressed in cm$^3$ at standard temperature and pressure (STP) permeating a thickness (T) expressed in cm of film per unit area (A) expressed in cm$^2$, per unit time (t) expressed in seconds and at a given concentration gradient or pressure drop of water vapor (p) expressed in cm Hg across the film.

Thus, in accordance with the foregoing, it has been determined that a suitable polymeric topcoat for the fertilizers of this invention should be formed from a polymer having a water vapor permeability ($P \times 10^{10}$) preferably of about 0.1-1000 and, more preferably, about 0.3-500.

Polymers having suitable permeability for use herein include polyvinyl chloride, polyvinylidene chloride, polyethylene, polypropylene, polyethylene terephthalate, polyurethane, polyamides, copolymers of dicyclopentadiene and linseed oil, copolymer blends of predominantly vinylidene chloride monomers and ethylenically unsaturated comonomers and mixtures thereof. Furthermore, as previously noted, the polymer coatings described in commonly assigned, co-pending U.S. patent application Ser. No. 07/655,157, filed Feb. 14, 1991, entitled "Abrasion Resistant Coatings for Fertilizers" and in commonly assigned U.S. Pat. No. 5,089,041, entitled "Encapsulated Slow Release Fertilizers," the disclosures of which have been incorporated herein by reference, are particularly suited for use herein.

In a preferred embodiment of the present invention, the process includes transferring a freshly produced sulfur coated fertilizer continuously to a polymer coating drum such as a two-stage drum designed for polymer application and preliminary product cooling. However, the process employed for applying the primary sulfur coating to the fertilizer core is not critical and may comprise any standard technique. For example, the process for applying the sulfur may be the TVA process. That is, granular fertilizer, typically urea, is metered into the process by a gravimetric feeder. The urea is heated via hot air to a temperature of 120°-190° F. (155°-175° F. preferred). This is accomplished in a fluid bed heater although the urea can also be heated in other types of heat transfer equipment, such as rotating drums, heated screw conveyors and the like.

The preheated urea is transferred continuously to a rotating drum for sulfur application. Molten sulfur (temperature 280°-310° F.) is pumped to the sulfur coating drum where it is applied to the rotating bed of urea through a number of hydraulic spray nozzles. Spray nozzles such as Spraying Systems' "Tee Jet 6500017" are typically used for this application although other alternate types of nozzles can be used. The temperature of the sulfur coated urea particles is controlled to 165°-180° F. by sweeping hot air through the drum.

The polymer is preferably applied in the molten state. Because of its viscosity, the polymer must be applied so as to prevent air entrainment which would cause pinholes in the coating, resulting in improper sealing. Care must be taken to avoid subjecting the polymer to high shear which would result in air entrainment. Low rpm agitators are used in the polymer melt tank and low rpm gear pumps are used to transfer the molten polymer to the polymer coating drum. Likewise, the application of the molten polymer to the sulfur coated urea, must be done under low shear conditions. Most preferably, this is done by "dribbling" the polymer onto the rotating bed of SCU. Spray nozzles are avoided because of air entrainment which would create pinholes in the coating.

The bed temperature within the coating section of the polymer drum is critical. It must be kept above the solidification temperature of the polymer in order to effectively topcoat the sulfur coated product. If the temperature is too low, the polymer solidifies before it can completely "wrap" the particle. The result is higher than desired nutrient release rates for the product. If the temperature is too high, the polymer stays liquid too long and adheres to the equipment rather than to the sulfur coated product. In the case of an ethylene vinyl acetate/polyethylene (EVA/PE) polymer/wax composite polymeric topcoat, the range of coating temperatures preferably is in the range of 150°-190° F. The most preferred range is 165°-180° F. When coated at the proper temperature, the mixture has a "dough like" consistency. Temperature control in the coating section of the drum is accomplished by blowing heated air into the drum.

The second stage of the polymer coating drum serves to cool the mixture to render it free-flowing. Without proper cooling, the product would not be flowable and would quickly plug chutework and other process equipment. The exit temperature of the cooling section must be below the solidification temperature of the polymer. In the case of an EVA/PE composite polymer topcoat, the product must be cooled to below 135° F. to render it flowable. The rate of cooling affects the durability of the coating. Since, the polymer shrinks by about 25% as it solidifies, it must be cooled slowly to prevent stress fractures in the coating. In the case of the EVA/PE composite, the preferred maximum cooling rate is 20° F. per minute. Cooling is accomplished by blowing air through the material as it rotates inside the drum. Rates of cooling can be altered by varying the amount of air and the temperature of the cooling air.

Once out of the polymer drum, the product is subsequently cooled to ambient conditions in a fluid bed cooler. The primary purpose of this operation is to prevent caking of the material during bulk storage. Caking is minimized when the product is cooled to below 100° F. Then, the final process operation is screening to remove any agglomerates which may have been formed during the coating process.

The resulting product is free-flowing, resistant to abrasion and handling, and possesses controlled release agronomic properties which vary with the amounts of sulfur and/or polymer applied.

Furthermore, in regard to a method of the present invention wherein an EVA/PE polymer/wax composite polymer topcoating is applied onto the surface of an SCU, the preferred process parameters for use therein may be summarized as follows:

| Process Variable | Range | Preferred Range |
|---|---|---|
| % Sulfur | 5-55 | 10-35 |
| % Polymer (EVA/PE) | 0.1-6.0 | 0.2-4.0 |
| Polymer Melt Temp (°F.) | 200-350 | 225-275 |
| Urea Preheat Temp (°F.) | 120-190 | 155-175 |
| Sulfur Temperature (°F.) | 270-310 | 290-310 |
| SCU Temp (°F.) | 120-190 | 165-180 |
| Polymer Temperature (°F.) | 200-350 | 230-270 |
| Polymer Coating Temp (°F.) | 150-190 | 165-180 |
| Polymer Cooling Temp (°F.) | 120-135 | 125-132 |
| Polymer Cooling Rate (°F./min) | 2-35 | 3-20 |

The following examples are provided to illustrate the preferred compositions, methods for their production, and comparative evaluations with prior art compositions. All percentages are percent by weight.

EXAMPLE 1

An extended residual, controlled release fertilizer product in accordance with the present invention having a primary sulfur coating (17% sulfur) and a polymeric topcoat (2% polymer) consisting of a polymer blend of polyethylene and ethylene vinyl acetate was prepared by the following process:

First, a sulfur coated urea was produced by continuously metering granular urea into a fluid bed heater at a rate of 1500 lb/hr. The urea was heated with hot air to a temperature of 155° F. The heated urea was sprayed with 305° F. molten sulfur inside a rotating drum. The sulfur was delivered through six 6500017 nozzles (Spraying Systems) at a rate of 310 lb/hr. Then, the resulting primary sulfur coated product exited the coating drum at 171° F. and was transferred directly into a separate drum for application of the secondary polymer coat. The polymer applied was a composite mixture of 75% low molecular weight polyethylene, commercially sold as Gulftene C30+ and 25% ethylene vinyl acetate (18% vinyl acetate), sold under the trade name of Elvax 420. The molten polymer composite (248° F.) was metered at 37 lb/hr to the polymer coating drum by means of a gear pump. The polymer was dribbled onto a rotating bed of sulfur coated urea (SCU). The temperature of the polymer application section of the drum was maintained at 169° F. to allow proper distribution of the polymer over the SCU particles. The polymer coated product was transferred to the cooling section of the drum where the product was cooled to 126° F. as it rotated through a curtain of ambient air. Final cooling to ambient conditions was accomplished in a separate fluid bed cooler. From this stage, the product was passed over a scalper screen to remove agglomerates. The final product had a −6+6 particle size (US Sieves), a total nitrogen content of 37.7% and a DDR as determined by the procedure described in Example 7 herein (1 hr/7 day) of 3.5/21%.

EXAMPLE 2

Utilizing the same processing equipment and employing the same general procedures as in Example 1, a variety of polymer coated SCU products in accordance with this invention were produced in addition to control products having no secondary polymer sealant coating over the SCU. The results of such production are tabulated in the following Table I wherein differences in processing conditions and in product analysis are noted:

EXAMPLE 3

A fertilizer product in accordance with the present invention having a primary sulfur coating (17% sulfur) and a polymeric topcoat (5% polymer) consisting of a latex applied vinylidene chloride composition is prepared by the following process:

A 380 gram sample of fresh sulfur coated urea (17% sulfur) produced within an hour of use and held at a minimum temperature of 120° F. is added into a bench-scale fluidized bed Wurster column. A vinylidene chloride-based latex (Ixan WA 50), 37.0 grams, 20.0 grams on a dry solids basis, is applied to the fluidized sulfur coated urea by spraying from the bottom of the bed at a rate of 1.01 grams/minute (0.00281 gram latex/gram fertilizer granule/minute). The fluidization/drying air flow rate is maintained between 123–128 $m^3$/hr (4.51–4.69 $m^3$/gram of water removed) and enters the bed at a temperature of 110°–26° F. The air exits the bed between 102° F. and 108° F. A 36 minute coating time is required to apply the 5% coating and is followed by a drying and a cooling phase. The resultant product has a 36% nitrogen analysis.

EXAMPLE 4

A fertilizer product in accordance with the present invention having a primary sulfur coating (17% sulfur) and a polymeric topcoat (2.5% polymer) consisting of a polyurethane composition is prepared by the following process:

A laboratory coating drum 16 inches in diameter and 8 inches long, equipped with straps every 6 inches of bed length to assure a rotating bed, is charged with 750 g of 38-0-0 SCU (17% sulfur coat on urea), particle size −6 +12 (U.S.A. Sieve Series). The sulfur coated urea is a freshly manufactured product less than one hour old that is maintained at a temperature above 120° F.

The drum is rotated at 25 RPM. The sulfur coated urea temperature of 176° F. is maintained as 7.7 g of polymeric diphenylmethane diisocyanate (BASF M10 Polymeric MDI, 31.7% isocyanate, 60 cps viscosity) and 11.5 g of polyethylene terephthalate polyester polyol (containing less than 0.1% water and containing 10% alkanolamine catayst and heated to 176° F.) are applied by spraying on the sulfur coated urea base.

TABLE I

| | Sample No. | | | | | | | | | | | | | | |
|---|---|---|---|---|---|---|---|---|---|---|---|---|---|---|---|
| | 2-1 | 2-2 | 2-3 | 2-4 | 2-5 | 2-6 | 2-7 | 2-8 | 2-9 | 2-10 | 2-11 | 2-12 | 2-13 | 2-14 | 2-15 |
| Coating % | | | | | | | | | | | | | | | |
| Sulfur | 13 | 13 | 13 | 13 | 13 | 15 | 17 | 17 | 19 | 19 | 19 | 19 | 19 | 19 | 19 |
| Polymer | 0 | 1 | 2 | 2.5 | 4 | 3 | 0 | 3 | 0 | .5 | 1 | 1.5 | 2 | 3 | 4 |
| Feed Rates (lb/hr) | | | | | | | | | | | | | | | |
| Urea | 2220 | 2220 | 2200 | 2200 | 1380 | 1680 | 1500 | 1650 | 1380 | 1320 | 1380 | 1380 | 1380 | 1380 | 1380 |
| Sulfur | 330 | 330 | 330 | 330 | 207 | 300 | 265 | 348 | 324 | 310 | 323 | 323 | 323 | 323 | 323 |
| Polymer | 0 | 26 | 49 | 64 | 64 | 64 | 0 | 60 | 0 | 8.2 | 15 | 34 | 44 | 53 | 69 |
| Temperatures (°F.) | | | | | | | | | | | | | | | |
| Urea | 166 | 166 | 166 | 166 | 176 | 172 | 155 | 156 | 164 | 165 | 164 | 162 | 163 | 163 | 162 |
| Sulfur | 310 | 310 | 311 | 310 | 311 | 311 | 305 | 309 | 311 | 309 | 311 | 311 | 311 | 311 | 310 |
| SCU | 175 | 175 | 173 | 173 | 175 | 178 | 171 | 170 | 177 | 176 | 177 | 174 | 175 | 176 | 176 |
| Polymer | 254 | 254 | 255 | 254 | 255 | 255 | 248 | 258 | 245 | 251 | 245 | 251 | 253 | 255 | 255 |
| Polymer Ctg. | 172 | 172 | 172 | 172 | 172 | 176 | 169 | 167 | 173 | 172 | 173 | 170 | 172 | 171 | 168 |
| Polymer Cool. | 129 | 129 | 127 | 127 | 127 | 140 | 126 | 132 | 126 | 132 | 126 | 123 | 124 | 122 | 122 |
| Analysis | | | | | | | | | | | | | | | |
| % Nitrogen | 40.0 | 40.9 | 39.5 | 37.0 | 38.4 | 37.0 | 39.1 | 38.2 | 37.2 | 37.7 | 37.9 | 36.5 | 37.0 | 35.6 | 35.0 |
| 1 Hr DDR | 52.6 | 5.4 | 4.5 | 2.7 | 3.4 | 2.0 | 42.6 | 2.1 | 23.4 | 11.1 | 3.1 | 3.2 | 2.2 | 1.5 | 1.4 |
| 7 Day DDR | 100.0 | 40.1 | 30.8 | 22.3 | 23.5 | 15.1 | 93.1 | 11.7 | 72.8 | 57.9 | 21.3 | 14.6 | 11.2 | 6.0 | 4.8 |

The product is kept at 176° F. in the rotating drum until surface reaction of isocyanate and polyol is complete.

The product has a 2.5% by weight polyurethane topcoat and a 37% nitrogen analysis.

EXAMPLE 5

A fertilizer in accordance with the present invention having a primary sulfur coating (17% sulfur) and a polymeric topcoat (2% polymer) consisting of a dicyclopentadiene linseed oil copolymer composition is prepared by the following process:

A coating drum as described in Example 4 is charged with 750 g of fresh sulfur coated urea (17% sulfur) produced within an hour of use and held at a minimum temperature of 120° F. The sulfur coated urea temperature in the coating drum is maintained at 176° F. as a 60% solution of dicyclopentadiene linseed oil copolymer in mineral spirits is spray applied thereover. The copolymer solution is ADM ML 189-70, 70% copolymer diluted with mineral spirits to 60% copolymer. Total weight of copolymer colution applied is 25.5 g containing 15.3 g of copolymer on a 100% basis.

Additional tumbling of the product is conducted at 176° F. until all solvent vapors are removed and the coating is dry and tack free.

The final product has a 2% topcoat of dicyclopentadiene linseed oil copolymer and a nitrogen analysis of 37%.

EXAMPLE 6

A fertilizer product in accordance with the present invention having a primary sulfur coating (17% sulfur) and a polymeric topcoat (2% polymer) consisting of a low density polyethylene composition is prepared by the following process:

A fluidized bed Wurster column is employed for application of a low density polyethylene in tetrachloroethylene solvent to 380 g of fresh sulfur coated urea granules (17% sulfur −6 +12 U.S.A. Sieve Series) produced within an hour of use and maintained at a minimum temperature of 120° F. A 3% solution of polyethylene (Dowlex 2032 LLDPE—density of 0.926) in tetrachloroethylene is applied to the sulfur coated urea fertilizer granules by spraying from the bottom of the spouted bed. A total of 15.2 g of linear low density polyethylene is applied while the sulfur coated urea temperature is maintained at 120° F.

The final product has a 2% topcoat of low density polyethylene and a 37% nitrogen analysis.

EXAMPLE 7

This example demonstrates the necessity of applying the polymer topcoat to a fresh sulfur coated urea as compared with polymer topcoats applied to aged sulfur coated products in order to achieve unique controlled release agronomic profiles as measured by agronomic testing.

Two test samples of product were produced by identical procedures wherein 750 g of sulfur coated urea (17% sulfur coating) was charged into a laboratory coating drum 16 inches in diameter, 8 inches in length with straps every 6 inches to maintain a rotating bed. While the drum rotated at 25 RPM, the temperature of the sulfur coated urea was increased to 140° F. with an air heater supplemented with a heat gun. The heat gun was removed, and 15.31 g (2% of product weight) of a polymer topcoat prepared by mixing 75 g of Gulftene C30+ and 25 g of ELVAX 420 (18% vinyl acetate), warming this mixture with stirring to 180° C., and stirring at this temperature for 30 minutes to produce a mixture having a viscosity of 300 to 340 centipoise at 125° C., and a melting point of 75° C. The resulting polymer topcoat was preheated to 150° C. and poured over the sulfur coated urea over a 20-30 second period of time. The product temperature was maintained at approximately 66° C. with the air heater while rotating in the drum for 10 minutes. Cool air was introduced to the drum for the two minutes to cool the product below 60° C. The product was discharged and screened (U.S.A. Sieve Series −6+12).

The sole difference between the two test samples prepared by this procedure was that one sample (Sample C) was produced with sulfur coated urea product from bagged storage (more than 30 days old). The crystal structure of such aged sulfur was 95% orthorhombic, and 5% amorphous with essentially no sulfur present in the monoclinic form. Another sample (Sample B) which corresponded to a product of the present invention was produced with fresh sulfur coated urea taken directly from a production sulfur coating drum and was used directly while less than one hour old. The temperature of the sulfur coated urea at this time was at least 122° F. At the time of polymer application, the sulfur morphology of this fresh sulfur was such that the monoclinic to orthorhombic transition was essentially complete while the predominance of the initially formed amorphous remained.

In addition, a third test sample (Sample A) was prepared in accordance with the process of Example 1 herein and a fourth test sample was prepared as a control having a sulfur coating applied thereto without any polymeric topcoat thereover.

Then, the differential dissolution rate (DDR) was determined for each of the test samples by a test procedure wherein a 25 g product sample was placed in 150 ml of distilled water at room temperature. At each time interval, all water was removed and replaced with fresh by pouring the water out through a screen. A 5 ml aliquot of the decanted wash was treated with urease. Ammonia released was titrated with 0.1 N HCl. Nitrogen found was expressed as a cumulative percentage of the total nitrogen of the product released in that time interval.

As a result of this testing, it was determined from the differential dissolution rates that only a modest sealant effect was achieved when the polymer was applied on aged sulfur coated urea but a dramatic sealant effect was demonstrated when fresh sulfur coated urea was employed as the substrate for the polymer topcoat. The results of this testing are shown in the following table:

TABLE II

| Sample # | SCU | Sulfur (%) | Topcoat (%) | 7 Day DDR |
| --- | --- | --- | --- | --- |
| Control | Fresh | 17 | 0 | 77 |
| Sample C | Aged | 17 | 2 | 57 |
| Sample B | Fresh | 17 | 2 | 24 |
| Sample A | Fresh | 17 | 2 | 21 |

The products described above were applied to Coventry Kentucky Bluegrass grown in the greenhouse. 400 cc pots (0.09 square feet) were fertilized with 2 lbs of N/1000 square feet in three different greenhouse tests: May 2, June 27 and September 21. Fresh weights were recorded periodically over a 60 day period.

Urea was included in each test as a control. In order to normalize environmental differences associated with the different test dates, the growth response of the materials was expressed as a percent of the total fresh weight yield obtained with urea at 60 days.

These growth response patterns are shown in FIG. 1 illustrating that when the polymer topcoat was applied to aged sulfur coated urea (Sample C), the growth response curve had a shape typical of matrix release (square root of time). However, when the same amount of polymer was applied to "fresh" sulfur coated urea (Sample B), the shape of the growth response curve changed to reflect a linear release. This linear release was also supported by the sample produced on fresh sulfur coated urea by the process of Example 1 (Sample A).

This research demonstrates that the application of polymer topcoat to fresh sulfur coated urea is essential for achieving diffusion release as demonstrated by agronomic response.

EXAMPLE 8

A series of tests was conducted to demonstrate the superior agronomic results achieved with a multi-layer product in accordance with the present invention having a primary sulfur coating with a polymeric topcoat as compared with products having only a single layer sulfur or a polymer coating.

In these tests, Coventry Kentucky Bluegrass grown in 400 cc pots (0.08 sq. ft.) in a greenhouse was fertilized with 2 lbs. of nitrogen/1000 sq. ft. The fertilizers employed for this purpose included a sample polymer coated SCU product of this invention (identified as Sample A) having a 17% sulfur and a 2% polymer coating which was produced in accordance with Example 1 herein. Another of the test fertilizer products was a sulfur coated urea having a 17% sulfur coating with no polymer topcoat which constituted Sample No. 2-7 of Example 2. A further test sample (Sample X herein) constituted a polymer coated urea having no primary sulfur coating which was prepared by the same procedure employed in Example 7 for preparing Samples B and C except that 750 g. of granular urea (US Sieve −7+14) was employed as the substrate for Sample X rather than sulfur coated urea which was employed for Samples B and C. The resulting product (Sample X) had a 2% polymer coating on the urea with the product having the following analysis: Total nitrogen—45.3%; DDR (1 hr.)—90.

Figure 2:
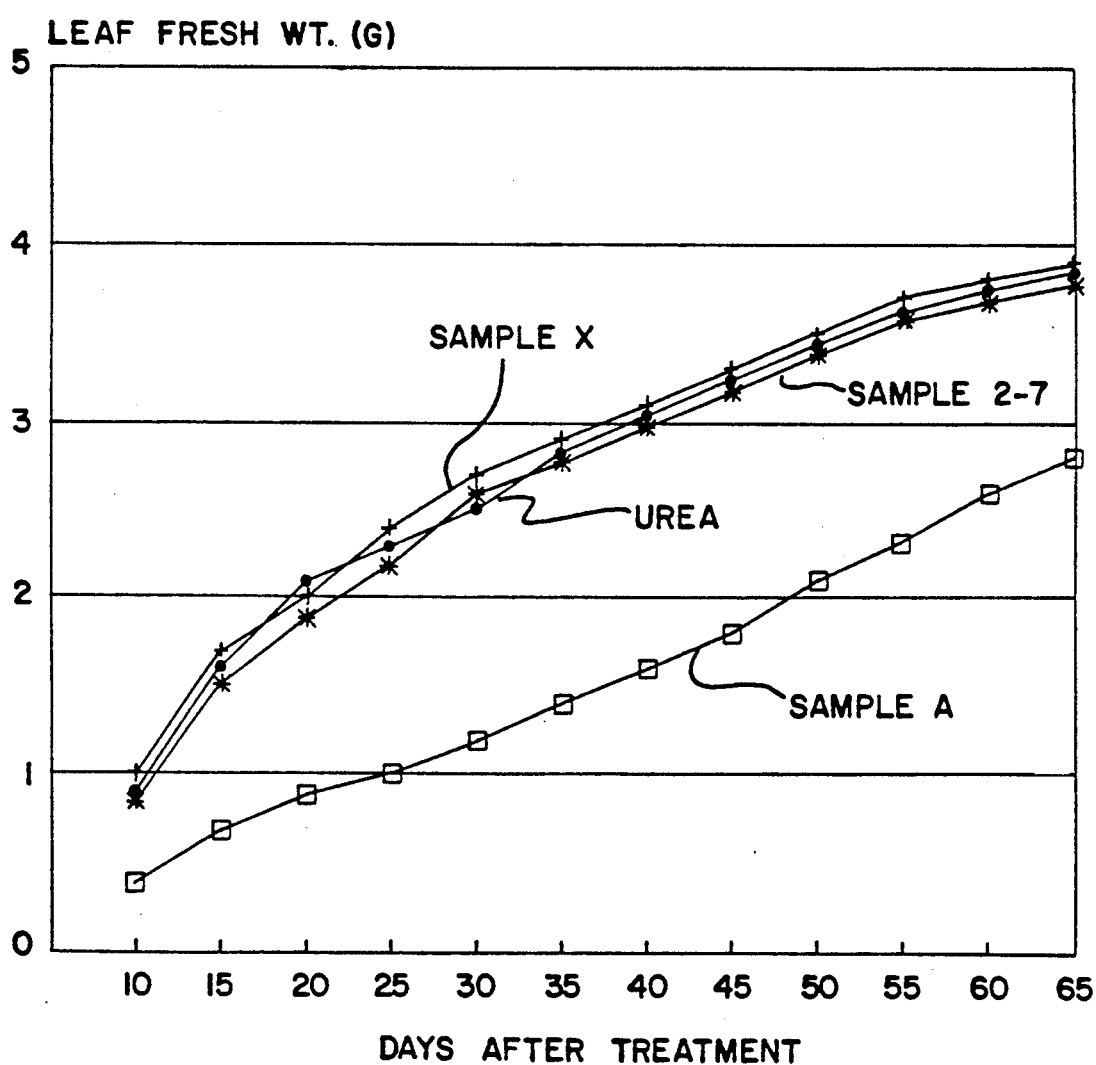
FIG. 2 is a graph of the agronomic response of Kentucky Bluegrass in regard to treatment with products of the present invention as compared with prior SCU and urea fertilizers.

As shown in FIG. 2, the only sample of those tested which demonstrated a slow release of nitrogen from the granule was the product in accordance with the present invention (i.e., Sample A). All other products resulted in growth which was similar to uncoated urea. Thus, the significance of applying a polymer topcoat over a fresh SCU in order to achieve improved controlled release properties has been demonstrated.

EXAMPLE 9

A series of tests were conducted in order to demonstrate the unique diffusion release kinetics achieved with polymer coated SCU products of the present invention as compared with prior SCU fertilizers.

In these tests, Coventry Kentucky Bluegrass grown in a greenhouse in a 400 cc pot (0.08 sq. feet.) was fertilized with 2 lbs. of nitrogen/1000 sq. feet. The fertilizers employed for this purpose included a sample polymer coated SCU product of this invention (identified as Sample A) having a 17% sulfur and a 2% polymer coating which was produced in accordance with Example 1 herein. A control sample representative of prior art SCU fertilizers employed in this testing constituted Sample No. 2-9 of Example 2 herein having a 19% sulfur coating, without any polymer topcoat. Another representative example of prior art SCU fertilizers employed in this testing was a sample of a commercially available coated SCU product of the TVA-type sold by Lesco Corporation (Sample D) which had a 13% sulfur primary coating with a secondary 3% soft wax sealant coating thereon having 2.5% conditioner therein.

Leaf fresh weight resulting from the fertilization was recorded periodically.

Figure 3:
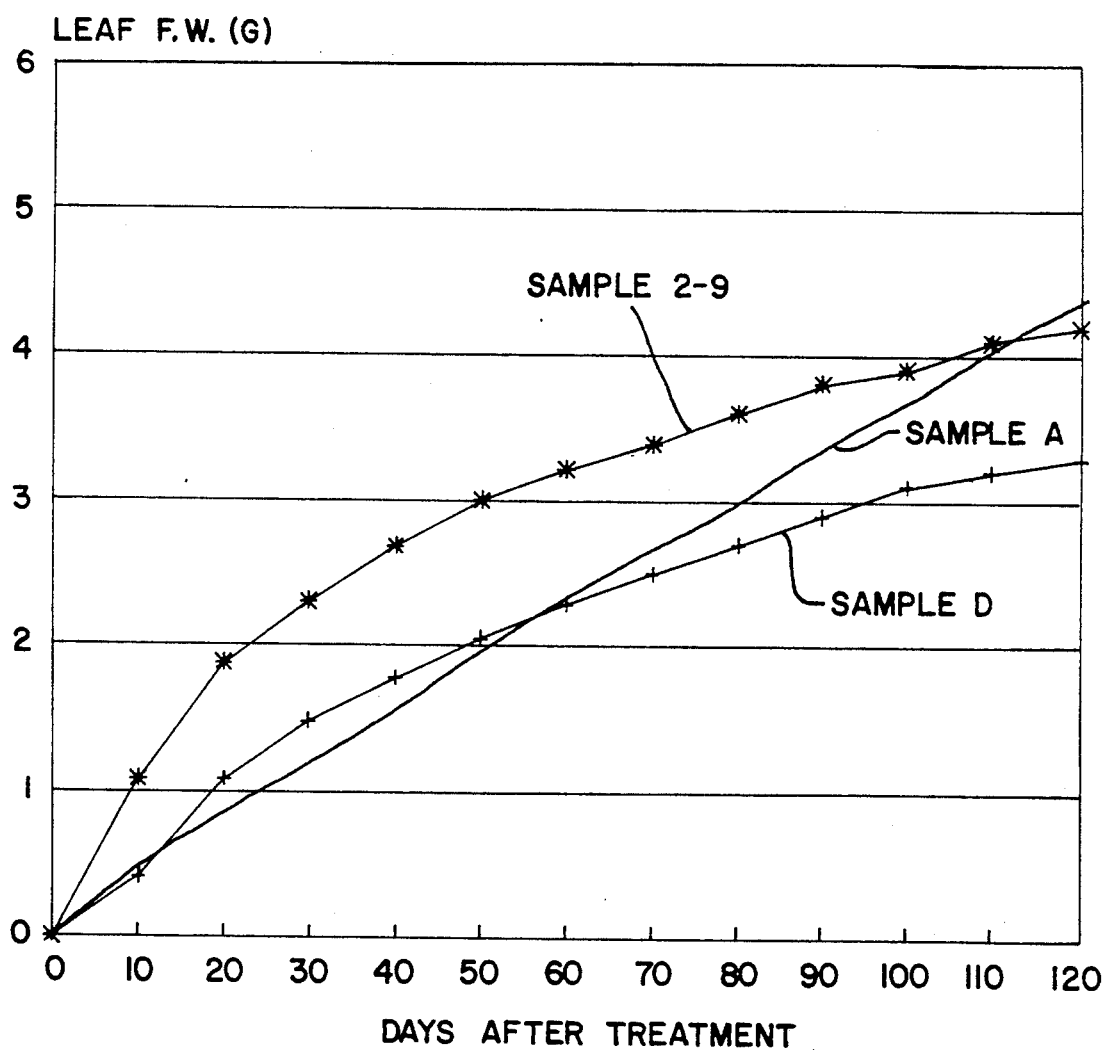
FIG. 3 is a graph of the agronomic effects of the present sulfur coated fertilizers in regard to release characteristics as compared with prior fertilizer products.

As illustrated graphically in FIG. 3, the product of this invention (Sample A) released nitrogen at a rate which resulted in a linear growth pattern over 120 days of the test. Thus, the diffusion release mechanism of the product is demonstrated as opposed to the prior art products which showed release of nitrogen based on the square root of time indicative of matrix release.

EXAMPLE 10

A series of tests were conducted in order to demonstrate the extended residuals achieved with polymer coated SCU products of the present invention as compared with prior SCU fertilizers.

In these tests, Coventry Kentucky Bluegrass grown in the greenhouse in a 400 cc pot (0.08 sq. ft.) was fertilized with 2 lbs. of nitrogen/1000 sq. feet. The fertilizers employed for this purpose were the same sample fertilizer products tested in Example 9 (i.e., Sample A, Sample 2-9 and Sample D).

The residual effect of the fertilizers was determined by measuring the clipping fresh weight during the 100-140th day of the test. As shown in Table III, the product of the present invention (Sample A) provided a dramatic increase in the growth of turf treated in this 110-140 day period as compared with the prior SCU products tested including both TVA wax topcoated and non-topcoated products.

TABLE III

| | Nitrogen (%) | Total Coating wt (%) | Fresh Weight* (110-140 days) (g) |
|---|---|---|---|
| Sample D (Prior Art) | 37 | 19 | 0.23 |
| Sample 2-9 (SCU without polymer topcoat) | 37 | 19 | 0.21 |
| Sample A (17% S with 2% polymer) | 37 | 19 | 0.74 |

*Growth exceeding the control (no fertilizer).

EXAMPLE 11

A series of tests were conducted to demonstrate the affect of sulfur coating thickness and polymer topcoat thickness on the release pattern and product longevity.

In these tests, Coventry Kentucky Bluegrass grown in a greenhouse in a 400 cc pot (0.08 sq. ft) was fertilized with 2 lbs. of nitrogen/1000 sq. feet. Leaf fresh weight was recorded periodically.

The fertilizers employed for purposes of this testing included a sample polymer coated SCU product of this invention (identified as Sample A) having a 17% sulfur and a 2% polymer coating which was produced in accordance with Example 1 herein. Other representative samples of products of the present invention utilized in this testing included Samples Nos. 2-2, 2-3, 2-5, 2-11, 2-13 and 2-15 of Example 2 herein. Control samples representative of prior art SCU fertilizers employed in this testing included Samples Nos. 2-1 and 2-9 of Example 2 herein.

Figure 4:
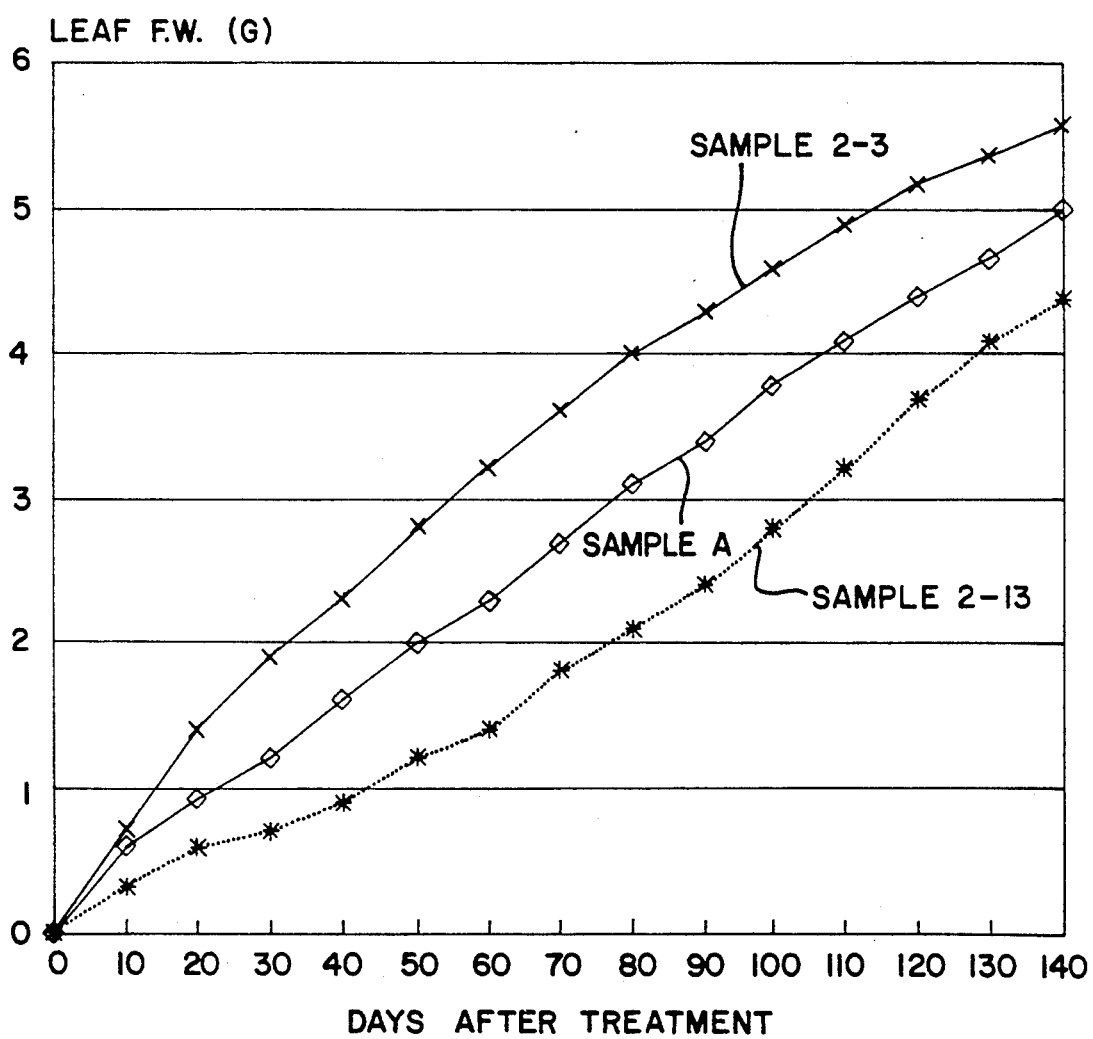
FIG. 4 is a graph showing the release patterns of various polymer topcoated SCU products of the present invention having varying sulfur coating weights with constant polymer topcoat weights.

As illustrated graphically in FIG. 4, the rate of release of products of this invention at constant polymer topcoat weight of 2% is significantly affected by varying the sulfur coating weights from 13% to 19%. That is, as the sulfur coating weight increases, the number of days required to obtain equal fresh weight production of 3 g. per pot was 54, 78 and 104 for 13, 17 and 19% sulfur coatings, respectively. Thus, it can be seen that mowing frequency and clipping removal can be reduced by adjusting the coating amounts of sulfur and polymer.

Figure 5:
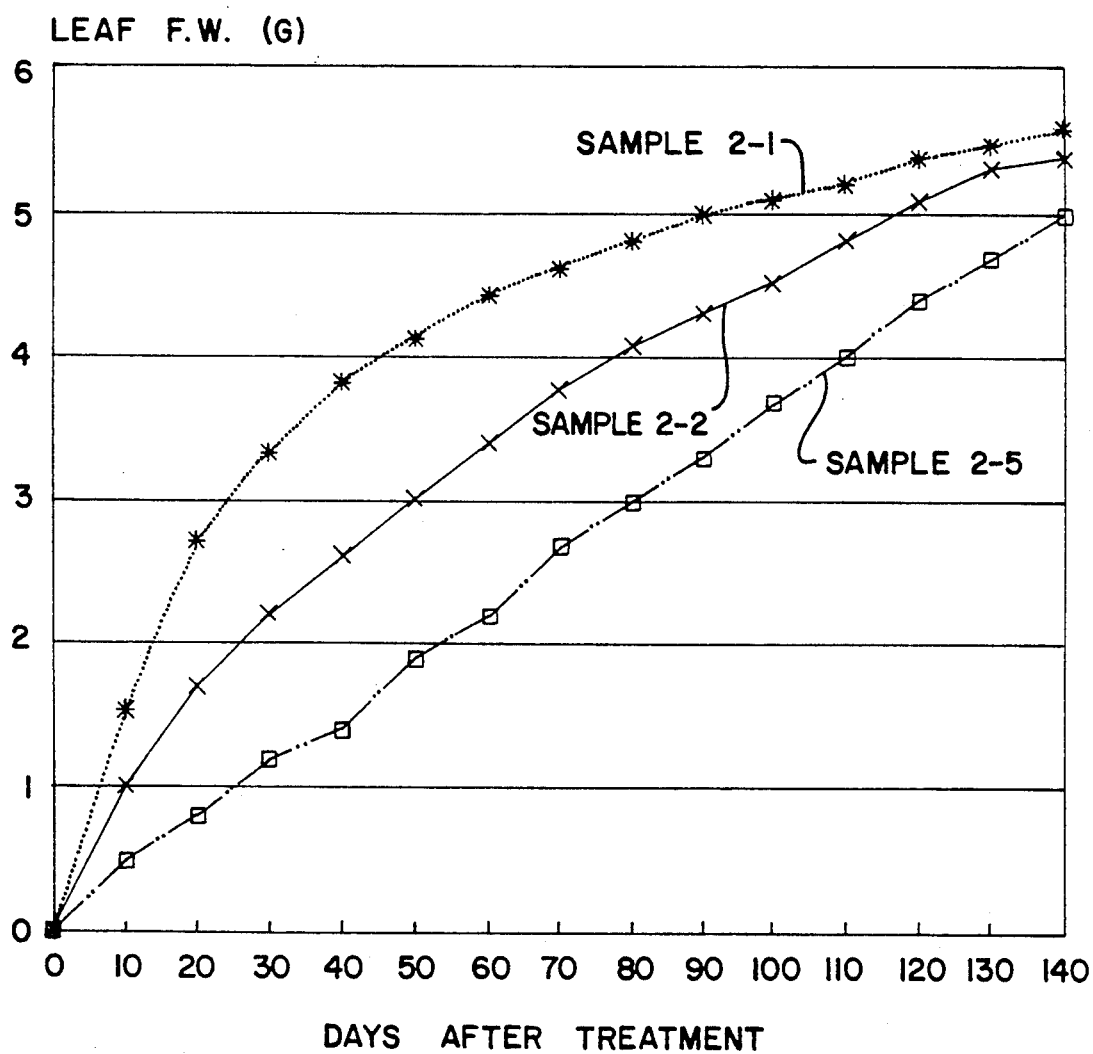
FIGS. 5 and 6 are graphs showing the release pattern of various polymer coated SCU products of the present invention having varying polymer topcoat weights with constant sulfur coating weights.

FIG. 5 illustrates that when sulfur coating weight was held constant at 13% and polymer topcoat Weights were varied, the release rate decreased as coating weight of polymer increased. In this regard, it required more days to achieve an equal yield of 3 g. per pot with a 4% polymer topcoat (80 days) than with a 1% polymer topcoat (50 days). Whereas, with no polymer topcoat, it took 24 days to achieve this 3 g. yield.

Figure 6:
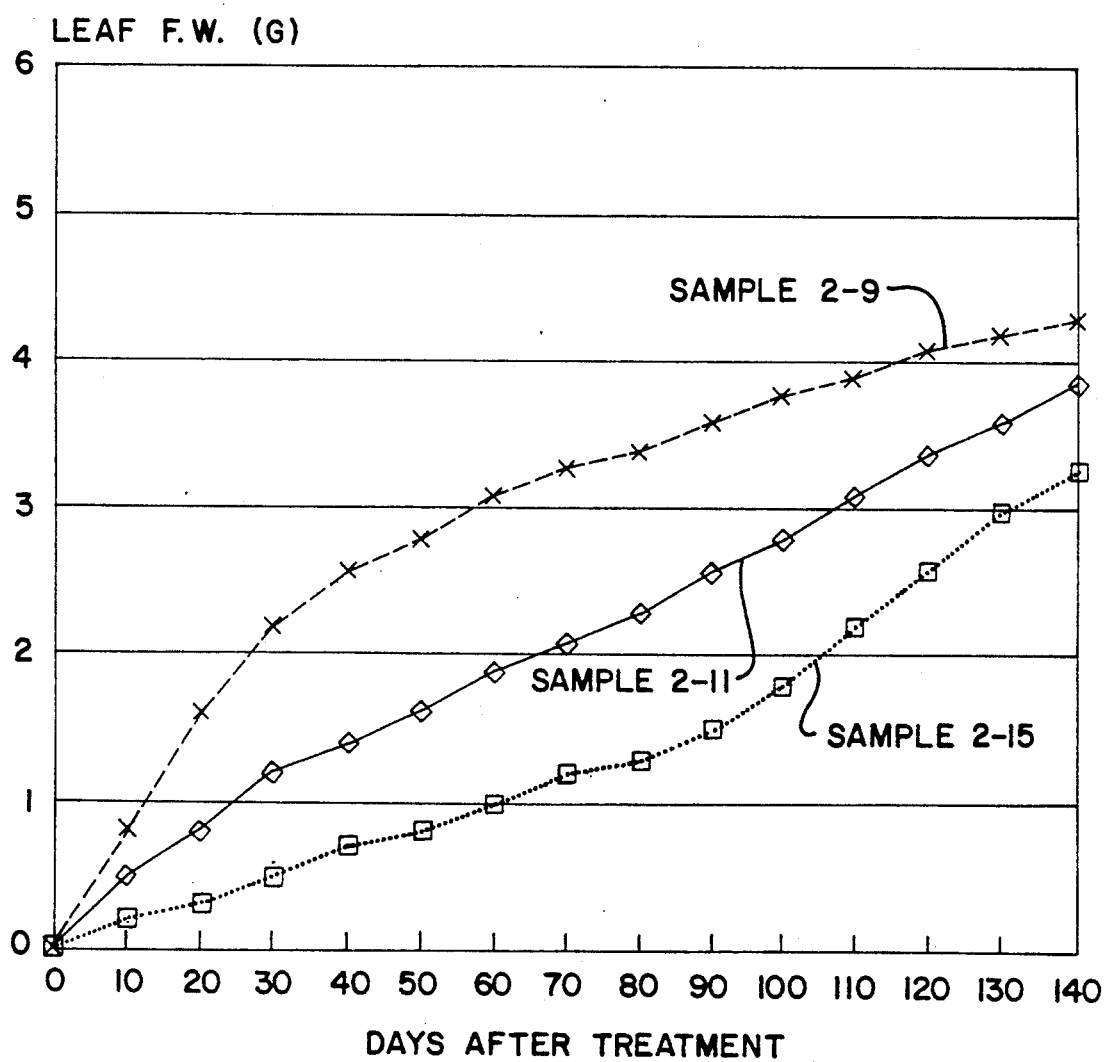

When sulfur coating weight was fixed at 19% and the polymer topcoat weights were varied from 0 to 4%, the release rate decreased as the coating weight of polymer increased as illustrated graphically in FIG. 6. In contrast to the 13% sulfur coating (FIG. 5), the nitrogen release rate was slower. Unlike prior matrix release products, the release rate of the products of this invention did not decrease with time. The days required to achieve a total yield of 3 g. per pot was 60, 106 and 130, respectively, for the 0, 1 and 4% polymer coatings. Again, mowing frequency and clipping removal may be reduced employing this technology.

As a further point, it should be noted that it has been found that a desired release pattern can be achieved by either varying the coating weight of sulfur or polymer in the products of this invention. For example, a 13% sulfur, 4% polymer product as exemplified by Sample No. 2-5 of Example 2 herein has been found to provide a turf growth response essentially identical to a 17% sulfur, 2% polymer coated product of this invention as exemplified by Sample A of Example 1 herein.

As regards product longevity, the results tabulated in Table IV demonstrate the desirable affects achieved with products of this invention when yields were totaled between the 110th and the 140th day of testing. As shown, when urea was coated with the same weight of sulfur and varying rates of polymer topcoat, the residuals increased with increasing polymer weight. Also, when the polymer topcoat weight was fixed at 2%, increase of the sulfur coating weight resulted in increased residual.

TABLE IV

| Sulfur (%) | Polymer Topcoat (%) | Sample | Leaf Fresh Weight* (110-140 days) (g) |
|---|---|---|---|
| 13 | 0 | Sample 2-1 | 0.14 |
| 13 | 1 | Sample 2-2 | 0.46 |
| 13 | 4 | Sample 2-5 | 0.59 |
| 19 | 0 | Sample 2-9 | 0.21 |
| 19 | 1 | Sample 2-11 | 0.61 |
| 19 | 4 | Sample 2-15 | 0.91 |
| 13 | 2 | Sample 2-3 | 0.57 |
| 17 | 2 | Sample A | 0.74 |

TABLE IV-continued

| Sulfur (%) | Polymer Topcoat (%) | Sample | Leaf Fresh Weight* (110-140 days) (g) |
|---|---|---|---|
| 19 | 2 | Sample 2-13 | 0.97 |

*Growth exceeding the control (no fertilizer)

EXAMPLE 12

A series of tests was conducted in order to demonstrate the extended residuals achieved with polymer coated SCU fertilizer products of the present invention as compared with prior SCU fertilizers having the same coating weights.

In these tests, Coventry Kentucky Bluegrass grown in 400 cc pots (0.08 square feet) was fertilized with various fertilizers at a rate of 2 lbs. of nitrogen/1000 square feet.

The fertilizers employed for purposes of conducting these tests included one set of 37-0-0 products including Sample A which was described herein above as representative of a product of the present invention having a 19% total coating weight and one set of 38-0-0 products including Sample No. 2-5 of Example 2 herein as representative of a product of the present invention having a 17% total coating weight. Examples of prior art 37-0-0 products having 19% total coating weights employed herein as controls were Samples D and 2-9 which were described in Example 14 herein. An example of a prior art 38-0-0 product having a 17% total coating weight employed herein as a control was a commercially available coated SCU product of the TVA-type sold by Purcell Corporation under the trade name "Sulfurcote" (referred to herein as Sample E). Sample E had a 12.5% sulfur primary coating with a secondary 2.1% sealant coating thereon having 2.5% conditioner therein. This sample (Sample E) exhibited a 7 day differential dissolution rate (DDR) of 39.0% with a total nitrogen content of 38.2%. Another example of a prior art 38-0-0 product with a 17% total coating weight employed herein as a control constituted Sample No. 2-7 of Example 2 herein. This Sample 2-7 exhibited a 7 day differential dissolution rate (DDR) of 93.1% and had a total nitrogen content of 39.1%.

Greenhouse turf response to the treatment of the grass pots with the test fertilizers as represented by leaf fresh weight of grass cuttings was recorded periodically. As shown by the data tabulated in Table V, fresh weight recorded during the last two months of the test (days 65-120) was increased when turf was fertilized with the products of this invention (Samples A and 2-5) as compared to the prior art products tested (i.e., Samples D, E, 2-7 and 2-9) thus demonstrating the significant extended residual effect achieved with the sealant coated SCU products of the present invention as compared with the prior art control products, at equal coating weights.

TABLE V

| Products Tested | Theoretical % N | Total ctg wt (%) | Leaf Fresh Weight (65-120 days) (g) |
|---|---|---|---|
| SAMPLE D (Prior Art) | 37 | 19 | 0.42 |
| SAMPLE 2-9 (Prior Art) | 37 | 19 | 0.57 |
| SAMPLE A | 37 | 19 | 1.43 |
| SAMPLE E (Prior Art) | 38 | 17 | 1.01 |
| SAMPLE 2-7 (Prior Art) | 38 | 17 | 0.60 |

TABLE V-continued

| Products Tested | Theoretical % N | Total ctg wt (%) | Leaf Fresh Weight (65-120 days) (g) |
|---|---|---|---|
| SAMPLE 2-5 | 38 | 17 | 1.42 |

EXAMPLE 13

A series of tests was conducted in order to demonstrate the extended residuals achieved with polymer coated SCU fertilizer products of the present invention having reduced coating weights as compared with prior SCU fertilizers.

In these tests, Coventry Kentucky Bluegrass grown in 400 cc pots (0.08 square feet) was fertilized with various fertilizers at a rate of 2 lbs. of nitrogen/1000 square feet.

The fertilizers employed for purposes of this testing included Samples No. 2-3 and 2-4 of Example 2 herein as representative of products of the present invention having total coating weights of 15% and 15.5%, respectively. Control samples representative of prior art products having higher total coating weights of 19% and 17%, respectively, were Sample D and E which were described in Example 15.

Greenhouse turf response to the treatment of the grass pots with the test fertilizers as expressed in terms of leaf fresh weight of grass cuttings was recorded periodically.

As shown by the data tabulated in Table VI, fresh weight recorded during the last two months of the test (days 65-120) was increased when turf was fertilized with the products of this invention (Samples 2-3 and 2-4) as compared with the prior art products tested (i.e., Samples D and E) thus demonstrating the extended residual effect achieved with the sealant coated SCU products of the present invention as compared with the prior art even when the coating weight of the present products is reduced relative to the prior art coatings.

TABLE VI

| Products Tested | Theoretical N (%) | Total ctg wt (%) | Fresh Weight (65-120 days) (g) |
|---|---|---|---|
| SAMPLE D (Prior Art) | 37 | 19 | 0.42 |
| SAMPLE E (Prior Art) | 38 | 17 | 1.01 |
| SAMPLE 2-3 | 39 | 15 | 1.30 |
| SAMPLE 2-4 | 39 | 15.5 | 1.84 |

EXAMPLE 14

A series of tests was conducted in order to demonstrate the improved nitrogen utilization efficiency of the polymer coated SCU fertilizer products of the present invention as compared with prior SCU fertilizers. Nitrogen utilization efficiency is based on total yield and turf color over an extended period of time.

In Greenhouse studies, Coventry Kentucky Bluegrass grown in 400 cc pots (0.08 square feet) was fertilized with various fertilizers at a rate of 2 lbs. of nitrogen/1000 square feet.

The fertilizers employed for purposes of this testing included Samples 2-2, 2-3 and 2-4 which were described in Example 2 herein as representative of products of the present invention having total coating weights of 14%, 15% and 15.5%, respectively. Control samples representative of prior art products each having a total coating weight of about 17% were Samples E and 2-7 which were described in Example 12.

Greenhouse turf response to the treatment of the grass pots with the test fertilizers as expressed in terms of leaf fresh weight of grass cuttings was recorded periodically and the results are shown in Table VII A, the total leaf fresh weight achieved as a result of an application of products of this invention (Samples 2-2, 2-3 and 2-4) dramatically exceeded that achieved in turf treated with one of the products of the prior art (Sample E). In contrast, the total yield with Samples 2-2, 2-3 and 2-4 were equal or slightly less than that realized from prior art Sample 2-7. Although this result might suggest equal efficiency of the products, the yield distribution was dramatically different. As the coating weight of the products of the present invention increased from 14 to 15.5% the initial yield decreased and the residual increased (metered efficiency). This metered efficiency characteristic which indicates a high yield of plant material with a slower growth rate initially followed by increasing yield with time is particularly important for turf and ornamental plants which require a more even release of nitrogen over a growing season.

In a further field study, Parade Kentucky bluegrass turf was fertilized with the above described fertilizers at a rate of 2 lbs nitrogen/1000 sq. ft. applied to 9 square foot (3 ft. ×3 ft.) plots. The turf was cut weekly at 2½" and watered as needed to prevent wilting. As shown in Table VII B, the color of the turf treated with the products of the present invention (Samples 2-2, 2-3 and 2-4) was improved over the prior art treated turf. This result demonstrates improved nitrogen efficiency since turf color is highly correlated with nitrogen uptake.

TABLE VII

| | | | A. Fresh Weight (g) | | | |
|---|---|---|---|---|---|---|
| | Theoretical | Total ctg wt | Incremental Leaf Fresh Weight (g) | | | |
| Product Tested | N % | (%) | 0-21 | 22-64 | 65-120 | Total |
| SAMPLE E (Prior Art) | 38 | 17.0 | 0.42 | 1.07 | 1.01 | 2.50 |
| SAMPLE 2-7 (Prior Art) | 38 | 17.0 | 1.94 | 1.30 | 0.60 | 3.84 |
| SAMPLE 2-2 | 39 | 14.0 | 1.21 | 1.47 | 0.90 | 3.58 |
| SAMPLE 2-3 | 39 | 15 | 0.96 | 1.57 | 1.30 | 3.83 |
| SAMPLE 2-4 | 39 | 15.5 | 0.42 | 1.40 | 1.84 | 3.66 |

| | | | B. Color (10 > 1) | | | | | | | | |
|---|---|---|---|---|---|---|---|---|---|---|---|
| | Theoretical | Total ctg wt | Days After Treatment | | | | | | | | Weeks of Excellent |
| Sample | % N | (%) | 7 | 14 | 21 | 28 | 35 | 42 | 49 | 55 | 63 | 79 | Color (>9) |
| SAMPLE E | 38 | 17 | 6.3 | 10 | 10 | 10 | 8.3 | 9.3 | 9.0 | 7.3 | 8.7 | 6.7 | 5 |

TABLE VII-continued

| | | | | | | | | | | | | |
|---|---|---|---|---|---|---|---|---|---|---|---|---|
| SAMPLE 2-7 | 38 | 17 | 10 | 9.7 | 10 | 9.3 | 7.3 | 6.7 | 5.0 | 6.0 | 6.0 | 4.7 | 4 |
| SAMPLE 2-2 | 39 | 14 | 8.3 | 10 | 10 | 10 | 10 | 10 | 9.7 | 9.7 | 10 | 8.7 | 8 |
| SAMPLE 2-3 | 39 | 15 | 7.3 | 9.7 | 10 | 10 | 10 | 10 | 10 | 9.7 | 10 | 8.7 | 8 |
| SAMPLE 2-4 | 39 | 15.5 | 6.0 | 7.3 | 8.3 | 10 | 9.7 | 10 | 10 | 9.7 | 10 | 8.3 | 6 |

EXAMPLE 15

In a field study, Parade Kentucky Bluegrass turf was fertilized with various fertilizers at a rate of 2 lbs. nitrogen/1000 sq. ft. applied to 9 square foot (3 ft. ×3 ft.) plots. The turf was cut weekly at 2½" and watered as needed to prevent wilting. This study was conducted in order to demonstrate that varying the weight of the polymer coating in products of the present invention greatly affects the nitrogen release patterns of such products.

The fertilizers employed for purposes of this testing included the following samples which were representative of the products of the present invention: Sample A was described hereinabove and Samples 2-2, 2-3, 2-4, 2-5, 2-8, 2-9, 2-10, 2-11, 2-12, 2-13, 2-14 and 2-15 which were described in Example 2. Representative prior art control products employed in this testing were as follows: Samples 2-1 and 2-9 which were described in Example 2.

The testing was conducted in two series and the results are tabulated in Table VIII. As shown in Table VIII, the early response of turf to fertilization (0-35 days) can be controlled with the sealant coated SCU products of the present invention by controlling the sulfur and the polymer topcoat weight. This result which advantageously enables "dialing in delayed release" of the product is contrary to the prior art wherein it has been documented that increasing of the sealant weight of TVA-type products has little impact on the release of the nitrogen from such sulfur coated urea products.

TABLE VIII

| Product Tested | S (%) | Sealant (%) | Turf Color 10 > 1* Days After Treating | | | | |
|---|---|---|---|---|---|---|---|
| | | | (7) | (14) | (21) | (28) | (35) |
| SAMPLE 2-1 | 13 | 0 | 10.0 | 10.0 | 10.0 | 10.0 | 9.3 |
| SAMPLE 2-2 | 13 | 1 | 8.3 | 10.0 | 10.0 | 10.0 | 10.0 |
| SAMPLE 2-3 | 13 | 2.0 | 7.3 | 9.7 | 10.0 | 10.0 | 10.0 |
| SAMPLE 2-4 | 13 | 2.5 | 6.0 | 7.3 | 8.3 | 10.0 | 9.7 |
| SAMPLE 2-5 | 13 | 4.0 | 6.3 | 9.0 | 10.0 | 10.0 | 9.0 |
| No Fertilizer | | | 3.3 | 3.0 | 3.0 | 3.0 | 3.0 |
| SAMPLE A | 17 | 2 | 5.3 | 8.7 | 9.0 | 10.0 | 10.0 |
| SAMPLE 2-8 | 17 | 3 | 4.3 | 6.3 | 6.7 | 8.7 | 10.0 |
| SAMPLE 2-9 | 19 | 0 | 10.0 | 10.0 | 10.0 | 10.0 | 9.3 |
| SAMPLE 2-10 | 19 | 0.5 | 10.0 | 10.0 | 10.0 | 10.0 | 8.7 |
| SAMPLE 2-11 | 19 | 1 | 5.3 | 8.3 | 7.7 | 9.3 | 9.3 |
| SAMPLE 2-12 | 19 | 1.5 | 4.3 | 7.0 | 6.3 | 8.7 | 9.7 |
| SAMPLE 2-13 | 19 | 2.0 | 4.0 | 5.7 | 4.7 | 9.3 | 10.0 |
| SAMPLE 2-14 | 19 | 3.0 | 4.0 | 4.0 | 4.0 | 7.3 | 9.3 |
| SAMPLE 2-15 | 19 | 4.0 | 4.0 | 4.0 | 4.3 | 6.7 | 8.3 |
| No Fertilizer | | | 3.3 | 3.0 | 3.0 | 3.0 | 3.3 |

*Acceptable turf color ≧ 7.0

EXAMPLE 16

A series of tests was conducted in order to demonstrate that polymer coated SCU fertilizer products of the present invention are less temperature sensitive than prior SCU fertilizers. Specifically, this testing was conducted in order to show that the products of the present invention do not shut down in cool weather as compared to prior art products.

In these tests, Parade Kentucky Bluegrass turf was fertilized with various fertilizers at a rate of 2 lbs. nitrogen/1000 sq. ft. applied to 9 square foot (3 ft. ×3 ft.) plots in the field. The grass was cut weekly at 2.5". Water was applied as needed with a minimum of 1" per week. Color of the turf was recorded weekly based on a scale of 10 being best and 1 being poorest.

The fertilizer employed for purposes of this testing as being representative of products of the present invention was Sample A which was described hereinabove. Control products employed in this testing were Sample D which was described in Example 9 and Sample E which was described in Example 15. An additional control sample comprised raw urea which was uncoated.

As shown in FIG. 8, after 4 weeks from fertilization (i.e., mid-October), response of all treatments was acceptable (color ranged from 9.0 to 10 with 7 to 10 an acceptable color). However, after seven weeks as the weather cooled in early November, the response to the prior art SCU products (Samples D and E) was below the acceptable level (less than 7.0) while all plots treated with the sealant coated SCU products of this invention (Sample A) were in the acceptable range of about 8.0-9.0. Since turf treated with urea still exhibited an acceptable color at the 7 week test date, the lack of response of the prior SCU products was associated with lack of nitrogen released and not a lack of residual.

This demonstrates that products of this invention are less temperature sensitive than the prior art and will perform better over a wider range of temperatures (cool weather in the spring and fall).

EXAMPLE 17

A test was conducted in order to demonstrate the resistance of polymer coated SCU fertilizer products of the present invention to environmental stress conditions as compared with prior SCU fertilizers.

In this test, 200-gram samples of a product in accordance with the present invention (i.e., Sample A which was described hereinabove) and a control product representative of the prior art (i.e., Sample E which was described in Example 15) were placed on Tyler screens. These screens were placed on a concrete porch floor under a high overhang. The samples had a southeastern exposure and received the complete morning sun. They were protected from the rain except for the spray from a driving rain. Any water collecting in the sample drained through the screen to minimize moisture as a factor in coating degradation.

Two samples of each product were placed in the sunlight exposure. One sample was withdrawn at the end of two weeks and a second sample at four weeks. Differential dissolution rates were determined for each sample and the results are shown in FIG. 9 which demonstrated that outdoor light exposure had almost no effect after one month on the polymer topcoated SCU of this invention (Sample A). On the other hand, controlled release characteristics of the prior art (Sample E) was demonstrated to have been greatly reduced upon the same exposure to the elements.

In addition to the foregoing and as previously noted, prior products have typically been coated with a soft wax such as polyethylene/brightstock oil. These coatings were soft and semi-fluid at room temperature. As such, the coated particles tended to stick to each other and did not flow well. Thus, flow conditioners, such as small particle clays or diatomaceous earth, had to be applied to the surface of the wax coated particles in order to render the particles flowable. The process for applying these conditioners involved large scale solids handling and metering equipment, a separate application drum, and significant environmental control (dust collection) equipment. In contrast, the sealant coatings of the present inventions may be applied as a melt and become hard, non-tacky, and free flowing at room temperature. Accordingly, no flow conditioners are required and the need for such ancillary equipment is eliminated. Furthermore, the soft wax/conditioner coatings of the prior art have tended to build up on process and application equipment requiring frequent shut downs for cleaning. In contrast, the coatings of this invention are hard, non-tacky, and free flowing at room temperature. Thus, the present products have demonstrated no evidence of buildup problems on mechanical equipment.

Although the invention has been described in its preferred forms with a certain degree of particularity, it is to be understood that the present disclosure has been made by way of example only. Numerous changes in the details of the compositions and in the operational steps of the methods and in the materials utilized therein will be apparent without departing from the spirit and scope of the invention, as defined in the appended claims.

We claim:

1. A process for the preparation of an extended residual controlled, release sulfur coated fertilizer product comprising:
    coating a particulate water-soluble fertilizer core with a fresh primary sulfur coating to provide a surface on said fertilizer core having essentially no stress induced discontinuities therein;
    applying a polymeric topcoat over said fresh primary sulfur coating, said sulfur coating being at a temperature of at least about 120° F. at the time said polymeric topcoat is applied thereover to maintain said surface in a condition without stress induced discontinuities; said sulfur coating containing sufficient amorphous sulfur content at the time said polymeric topcoat is applied thereover to preserve surface integrity of said coating; and said polymeric topcoat consisting essentially of a water insoluble polymeric film-forming composition having membrane-like permeability characteristics for release of said fertilizer at a diffusion controlled rate of essentially zero-order such that said fertilizer releases from said primary sulfur coating and said polymeric topcoat essentially linearly over time.

2. The process of claim 1 wherein said sulfur coating has not been cooled to a temperature below about 120° F. prior to application of said polymeric topcoat thereover.

3. The process of claim 1 wherein said fertilizer core is urea.

4. The process of claim 1 wherein said sulfur coating is less than about 12 hours old at the time said polymeric topcoat is applied thereover.

5. The process of claim 1 wherein said polymeric composition comprises a sealant composition having a melting point below about 105° C. and from about 5 to about 50 percent (by weight) of a polymer selected from the group consisting of:
    ethylene-vinyl acetate copolymers in which the weight ratio of ethylene to vinyl acetate is from about 20 to about 2, and the molecular weight is from about 2,000 to 20,000; and
    ethylene-acrylic acid copolymers in which the ratio of ethylene to acrylic acid is from about 50 to about 10, and the molecular weight is from about 2,000 to 20,000; and from about 95 to about 50 percent of a hydrocarbon wax chosen from the group consisting of:
    natural petroleum waxes having drop melting points between about 60° C. and 80° C., containing less than about 5% oil as determined by ASTM method D721, and essentially free of aromatic or cyclic structures; and
    synthetic hydrocarbon waxes which melt between about 60° C. and 105° C., and have molecular weight between about 400 and 600.

6. The process of claim 1 wherein said polymeric composition is selected from the group consisting of polyvinyl chloride, polyvinylidene chloride, polyethylene, polypropylene, polyethylene terephthalate, polyurethane, polyamides, copolymers of dicyclopentadiene and linseed oil, copolymer blends of predominantly vinylidene chloride monomers and ethylenically unsaturated comonomers and mixtures thereof.

7. The process of claim 1 wherein said polymeric film-forming composition has a water vapor permeability of about 0.1-1000.

8. The process of claim 1 wherein said polymeric film-forming composition has a melting temperature of about 120° F.-205° F. and is applied over the sulfur coating in molten form.

9. The process of claim 8 wherein said molten polymeric composition is applied under low shear conditions.

10. The process of claim 8 wherein said polymeric film-forming composition is applied over the sulfur coating by dribbling said molten polymeric composition thereover.

11. The process of claim 1 wherein said amorphous sulfur content of said sulfur coating at the time said polymeric topcoat is applied thereover is greater than about 10% (by weight of the sulfur coating as measured by differential scanning calorimetry techniques).

12. The process of claim 8 wherein the temperature of the fresh sulfur coating at the time said molten polymeric film-forming composition is applied thereover is about 120° F.-190° F.

13. A process for the preparation of an extended residual, controlled release sulfur coated fertilizer product comprising:
    coating a particulate water-soluble fertilizer core with a primary sulfur coating;
    applying a molten polymeric topcoat over said primary sulfur coating under low shear conditions while said sulfur coating on said fertilizer core is still fresh, said fresh sulfur coating having been cooled to a temperature not less than about 120° F. prior to application of said polymeric topcoat thereover but sufficiently to provide a surface on said fertilizer core having essentially no stress induced discontinuities therein, said sulfur coating containing sufficient amorphous sulfur content at the time said polymeric topcoat is applied thereover to preserve surface integrity of said coating; and said molten polymeric topcoat consisting essentially of a water insoluble polymeric film-forming composition having a melting temperature greater than about 120° F. and having membrane-like permeability characteristics; and solidifying said molten polymeric topcoat applied over said primary sulfur coating to provide an outer encapsulating layer through which said fertilizer is released at a diffusion controlled rate of essentially zero-order such that said fertilizer releases from said primary sulfur coating and said polymeric topcoat essentially linearly over time.

14. The process of claim 13 wherein said fertilizer core is urea.

15. The process of claim 13 wherein said fresh sulfur coating is less than about 12 hours old at the time said polymeric topcoat is applied thereover.

16. The process of claim 13 wherein said polymeric composition comprises a sealant composition having a melting point below about 105° C. and from about 5 to about 50 percent (by weight) of a polymer selected from the group consisting of:

ethylene-vinyl acetate copolymers in which the weight ratio of ethylene to vinyl acetate is from about 20 to about 2, and the molecular weight is from about 2,000 to 20,000; and ethylene-acrylic acid copolymers in which the ratio of ethylene to acrylic acid is from about 50 to about 10, and the molecular weight is from about 2,000 to 20,000;

and from about 95 to about 50 percent of a hydrocarbon wax chosen from the group consisting of:

natural petroleum waxes having drop melting points between about 60° C. and 80° C., containing less than about 5% oil as determined by ASTM method D721, and essentially free of aromatic or cyclic structures; and synthetic hydrocarbon waxes which melt between about 60° C. and 105° C., and have molecular weight between about 400 and 1500.

17. The process of claim 13 wherein said polymeric composition is selected from the group consisting of polyvinyl chloride, polyvinylidene chloride, polyethylene, polypropylene, polyethylene terephthalate, polyurethane, polyamides, copolymers of dicyclopentadiene and linseed oil, copolymer blends of predominantly vinylidene chloride monomers and ethylenically unsaturated comonomers and mixtures thereof.

18. The process of claim 13 wherein said polymeric film-forming composition has a water vapor permeability of about 0.1–1000.

19. The process of claim 13 wherein said polymeric film-forming composition has a melting temperature of about 120° F.–205° F.

20. The process of claim 19 wherein said polymeric film-forming composition is applied over the sulfur coating by dribbling said molten polymeric composition thereover.

21. The process of claim 13 wherein said amorphous sulfur content of said fresh sulfur coating at the time said polymeric topcoat is applied thereover is greater than about 10% (by weight of the sulfur coating as measured by differential scanning calorimetry techniques).

22. The process of claim 19 wherein the temperature of the fresh sulfur coating at the time said molten polymeric film-forming composition is applied thereover is about 120° F.–190° F.

23. An extended residual, controlled release coated fertilizer product providing for the release of said fertilizer from said coating at a diffusion controlled rate linearly over time, said product comprising:

a particulate water-soluble fertilizer core having a primary sulfur coating thereon with a polymeric topcoat applied thereover;

said primary sulfur coating having been fresh at the time said polymeric topcoat is applied thereover, said fresh sulfur coating having been cooled to a temperature not below about 120° F. at the time said polymeric topcoat is applied thereover to provide a surface on said fertilizer core which has essentially no stress induced surface discontinuities therein at the time said polymeric topcoat is applied thereover and said sulfur coating includes a sufficient amorphous sulfur content at the time said polymeric topcoat is applied thereover to preserve surface integrity of said coating; and said polymeric topcoat being formed from a water insoluble polymeric film-forming composition having membrane-like permeability characteristics for release of said fertilizer at a diffusion controlled rate of essentially zero-order from said primary sulfur coating and said polymeric topcoat such that said fertilizer releases essentially linearly over time.

24. The product of claim 23 wherein said fresh sulfur coating has not been cooled to a temperature below about 120° F. prior to application of said polymeric topcoat thereover.

25. The product of claim 23 wherein said fertilizer core is urea.

26. The product of claim 23 wherein said fresh sulfur coating is less than about 12 hours old at the time said polymeric topcoat is applied thereover.

27. The product of claim 23 wherein said polymeric composition comprises a sealant composition having a melting point below about 105° C. and from about 5 to about 50 percent (by weight) of a polymer selected from the group consisting of:

ethylene-vinyl acetate copolymers in which the weight ratio of ethylene to vinyl acetate is from about 20 to about 2, and the molecular weight is from about 2,000 to 20,000; and ethylene-acrylic acid copolymers in which the ratio of ethylene to acrylic acid is from about 50 to about 10, and the molecular weight is from about 2,000 to 20,000; and from about 95 to about 50 percent of a hydrocarbon wax chosen from the group consisting of:

natural petroleum waxes having drop melting points between about 60° C. and 80° C., containing less than about 5% oil as determined by ASTM method D721, and essentially free of aromatic or cyclic structures; and synthetic hydrocarbon waxes which melt between about 60° C. and 105° C., and have molecular weight between about 400 and 1500.

28. The product of claim 23 wherein said polymeric composition is selected from the group consisting of polyvinyl chloride, polyvinylidene chloride, polyethylene, polypropylene, polyethylene terephthalate, polyurethane, polyamides, copolymers of dicyclopentadiene and linseed oil, copolymer blends of predominantly vinylidene chloride monomers and ethylenically unsaturated comonomers and mixtures thereof.

29. The product of claim 23 wherein said polymeric film-forming composition has a water vapor permeability of about 0.1–1000.

30. The product of claim 23 wherein said polymeric film-forming composition has a melting temperature of about 120° F.–205° F. and is applied over the sulfur coating in molten form.

31. The product of claim 30 wherein said polymeric film-forming composition is applied over the sulfur coating by dribbling said molten polymeric composition thereover.

32. The product of claim 23 wherein said amorphous sulfur content of said fresh sulfur coating at the time said polymeric topcoat is applied thereover is greater than about 10% (by weight of the sulfur coating as measured by differential scanning calorimetry techniques).

33. The product of claim 30 wherein the temperature of the fresh sulfur coating at the time said molten polymeric film-forming composition is applied thereover is about 120° F.–190° F.

34. An extended residual, controlled release coated fertilizer product providing for the release of said fertilizer from said coating at a diffusion controlled rate linearly over time, said product comprising:
a particulate water-soluble fertilizer core having a primary sulfur coating thereon with a polymeric topcoat applied thereover;
said primary sulfur coating having been fresh at the time said polymeric topcoat is applied thereover, said fresh sulfur coating having been cooled to a temperature not less than about 120° F. prior to application of said polymeric topcoat thereover but having been cooled sufficiently to provide a surface on said fertilizer core which has essentially no stress induced surface discontinuities therein at the time said polymeric topcoat is applied thereover and said sulfur coating includes a sufficient amorphous sulfur content at the time said polymeric topcoat is applied thereover to preserve surface integrity of said coating; and
said polymeric topcoat being formed from a water insoluble polymeric film-forming composition having a melting temperature greater than about 120° F. and having membrane-like permeability characteristics for release of said fertilizer at a diffusion controlled rate of essentially zero-order such that said fertilizer releases from said primary sulfur coating and said polymeric topcoat essentially linearly over time.

35. The product of claim 34 wherein said fertilizer core is urea.

36. The product of claim 34 wherein said fresh sulfur coating is less than about 12 hours old at the time said polymeric topcoat is applied thereover.

37. The product of claim 34 wherein said polymeric composition comprises a sealant composition having a melting point below about 105° C. and from about 5 to about 50 percent (by weight) of a polymer selected from the group consisting of:
ethylene-vinyl acetate copolymers in which the weight ratio of ethylene to vinyl acetate is from about 20 to about 2, and the molecular weight is from about 2,000 to 20,000; and
ethylene-acrylic acid copolymers in which the ratio of ethylene to acrylic acid is from about 50 to about 10, and the molecular weight is from about 2,000 to 20,000;
and from about 95 to about 50 percent of a hydrocarbon wax chosen from the group consisting of:
natural petroleum waxes having drop melting points between about 60° C. and 80° C., containing less than about 5% oil as determined by ASTM method D721, and essentially free of aromatic or cyclic structures; and
synthetic hydrocarbon waxes which melt between about 60° C. and 105° C., and have molecular weight between about 400 and 1500.

38. The product of claim 34 wherein said polymeric composition is selected from the group consisting of polyvinyl chloride, polyvinylidene chloride, polyethylene, polypropylene, polyethylene terephthalate, polyurethane, polyamides, copolymers of dicyclopentadiene and linseed oil, copolymer blends of predominantly vinylidene chloride monomers and ethylenically unsaturated comonomers and mixtures thereof.

39. The product of claim 34 wherein said polymeric film-forming composition has a water vapor permeability of about 0.1–1000.

40. The product of claim 34 wherein said polymeric film-forming composition has a melting temperature of about 120° F.–205° F.

41. The product of claim 40 wherein said polymeric film-forming composition is applied over the sulfur coating by dribbling said molten polymeric composition thereover.

42. The product of claim 34 wherein said amorphous sulfur content of said fresh sulfur coating at the time said polymeric topcoat is applied thereover is greater than about 10% (by weight of the sulfur coating as measured by differential scanning calorimetry techniques).

43. The product of claim 40 wherein the temperature of the fresh sulfur coating at the time said molten polymeric film-forming composition is applied thereover is about 120° F.–190° F.

* * * * *